US010000613B2

(12) United States Patent
Xiong et al.

(10) Patent No.: US 10,000,613 B2
(45) Date of Patent: *Jun. 19, 2018

(54) METHODS OF MAKING AN ELASTOMER COMPOSITE REINFORCED WITH SILICA AND CARBON BLACK AND PRODUCTS CONTAINING SAME

(71) Applicant: Cabot Corporation, Boston, MA (US)

(72) Inventors: Jincheng Xiong, Boxborough, MA (US); Martin C. Green, Boxborough, MA (US); William R. Williams, Charlotte, NC (US); Dmitry Fomitchev, Lexington, MA (US); Gerald D. Adler, Charlestown, MA (US); Duane G. McDonald, Cambridge, MA (US); Ron Grosz, Andover, MA (US); Michael D. Morris, Nashua, NH (US)

(73) Assignee: Cabot Corporation, Boston, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/600,017

(22) Filed: May 19, 2017

(65) Prior Publication Data

US 2017/0306108 A1    Oct. 26, 2017

Related U.S. Application Data

(63) Continuation of application No. PCT/US2016/042109, filed on Jul. 13, 2016.

(60) Provisional application No. 62/192,891, filed on Jul. 15, 2015, provisional application No. 62/294,599, filed on Feb. 12, 2016.

(51) Int. Cl.
*C08J 3/215* (2006.01)
*C08J 3/22* (2006.01)
*C08K 3/04* (2006.01)
*C08K 3/36* (2006.01)

(52) U.S. Cl.
CPC ............... *C08J 3/22* (2013.01); *C08K 3/04* (2013.01); *C08K 3/36* (2013.01); *C08J 2307/02* (2013.01)

(58) Field of Classification Search
CPC ................. C08K 9/04; C08K 3/36; C08J 3/22
See application file for complete search history.

(56) References Cited

U.S. PATENT DOCUMENTS

| | | | |
|---|---|---|---|
| 4,250,082 A | 2/1981 | Sommer et al. | |
| 5,674,932 A | 10/1997 | Agostini et al. | |
| 5,763,388 A | 6/1998 | Lightsey et al. | |
| 6,048,923 A | 1/2000 | Mabry et al. | |
| 6,040,364 A | 3/2000 | Mabry et al. | |
| 6,075,084 A | 6/2000 | Mabry et al. | |
| 6,372,822 B1 | 4/2002 | Chung et al. | |
| 6,534,569 B2 | 3/2003 | Mahmud et al. | |
| 6,908,961 B2 | 6/2005 | Wang et al. | |
| 8,357,733 B2 | 1/2013 | Wallen et al. | |
| 8,791,177 B2* | 7/2014 | Morris | C08J 3/22 523/318 |
| 9,096,735 B2* | 8/2015 | Morris | B29B 7/465 |
| 9,115,258 B2 | 8/2015 | De Gaudemaris et al. | |
| 9,175,144 B2 | 11/2015 | Berriot et al. | |
| 9,284,420 B2 | 3/2016 | De Gaudemaris et al. | |
| 9,290,626 B2 | 3/2016 | De Gaudemaris et al. | |
| 9,290,627 B2 | 3/2016 | De Gaudemaris et al. | |
| 2002/0016404 A1 | 2/2002 | Mabry et al. | |
| 2003/0100660 A1* | 5/2003 | Zanzig et al. | C08L 9/00 524/492 |
| 2003/0195276 A1 | 10/2003 | Mabry et al. | |
| 2004/0109944 A1 | 6/2004 | Schmitt et al. | |
| 2006/0143938 A1 | 7/2006 | Karato et al. | |
| 2009/0062428 A1 | 3/2009 | Zhang et al. | |
| 2009/0111923 A1 | 4/2009 | Jiang et al. | |
| 2011/0244382 A1* | 10/2011 | Christopher | G03G 9/09725 430/105 |
| 2012/0259035 A1 | 10/2012 | Berriot et al. | |
| 2012/0264849 A1 | 10/2012 | Berriot et al. | |
| 2012/0264875 A1 | 10/2012 | Berriot et al. | |
| 2013/0303687 A1* | 11/2013 | Thomasson | C08J 3/226 524/575.5 |
| 2013/0317137 A1 | 11/2013 | Thomasson et al. | |
| 2013/0345348 A1 | 12/2013 | Bibette et al. | |
| 2014/0011922 A1 | 1/2014 | Bibette et al. | |
| 2014/0249247 A1 | 9/2014 | De Gaudemaris et al. | |
| 2014/0249249 A1 | 9/2014 | De Gaudemaris et al. | |
| 2014/0249251 A1 | 9/2014 | De Gaudemaris et al. | |
| 2014/0256845 A1 | 9/2014 | De Gaudemaris et al. | |

(Continued)

FOREIGN PATENT DOCUMENTS

| | | |
|---|---|---|
| CN | 103159994 | 2/2015 |
| EP | 1834980 B1 | 4/2012 |

(Continued)

OTHER PUBLICATIONS

International Search Report and the Written Opinion of the International Searching Authority, or the Declaration of International Patent Application No. PCT/US2016/042081, dated Sep. 28, 2016.
International Search Report and the Written Opinion of the International Searching Authority, or the Declaration of International Patent Application No. PCT/US2016/042120, dated Sep. 28, 2016.
International Search Report and the Written Opinion of the International Searching Authority, or the Declaration of International Patent Application No. PCT/US2016/042102, dated Sep. 21, 2016.
International Search Report and the Written Opinion of the International Searching Authority, or the Declaration of International Patent Application No. PCT/US2016/042109, dated Sep. 21, 2016.
Zaccone, A., et al., "Shear-Induced Reaction-Limited Aggregation Kinetics of Brownian Particles at Arbitary Concentrations", The Journal of Chemical Physics 132, 134903 (2010).

(Continued)

*Primary Examiner* — Hannah J Pak

(57) ABSTRACT

Methods to make a silica and carbon black elastomer composite with a destabilized dispersion that includes silica are described, along with particle reinforced elastomer composites made from the methods. The advantages achieved with the methods are further described.

29 Claims, 7 Drawing Sheets

(56) References Cited

U.S. PATENT DOCUMENTS

| | | |
|---|---|---|
| 2014/0256846 A1 | 9/2014 | Sevignon et al. |
| 2014/0296378 A1 | 10/2014 | De Gaudemaris et al. |
| 2015/0011678 A1 | 1/2015 | Bibette et al. |
| 2015/0038617 A1 | 2/2015 | De Gaudemaris et al. |
| 2015/0267008 A1 | 9/2015 | Bibette et al. |
| 2016/0168341 A1 | 6/2016 | Wang et al. |
| 2016/0185921 A1 | 6/2016 | Wang et al. |

FOREIGN PATENT DOCUMENTS

| | | |
|---|---|---|
| FR | 2588008 A1 | 4/1987 |
| JP | 2005/179436 A | 7/2005 |
| JP | 2013/064072 A | 4/2013 |
| WO | WO 97/36957 | 10/1997 |
| WO | WO 01/10946 A2 | 2/2001 |
| WO | WO 02/096914 A2 | 12/2002 |
| WO | WO 03/042285 | 5/2003 |
| WO | WO 03/050182 | 6/2003 |
| WO | WO 2009/099623 | 8/2009 |
| WO | WO 2011/034581 | 3/2011 |
| WO | WO 2011/034587 | 3/2011 |
| WO | WO 2011/034589 A2 | 3/2011 |
| WO | WO 2012/037244 | 3/2012 |
| WO | WO 2014/110499 | 7/2014 |
| WO | WO 2014/189826 | 11/2014 |
| WO | WO 2016/014037 A1 | 1/2016 |
| WO | WO 2017/011548 | 1/2017 |
| WO | WO 2017/011561 | 1/2017 |
| WO | WO 2017/011566 | 1/2017 |
| WO | WO 2017/011570 | 1/2017 |

OTHER PUBLICATIONS

Wang, M.-J., et al., "NR/Carbon Black Masterbatch Produced with Continuous Liquid Phase Mixing[1]", KGK Kautschuk Gummi Kunststoffe 55, Jahrgang, Nr. 7-8/2002, pp. 1-10.

Alves Júnior, José A., et al., "The Behavior of Zeta Potential of Silica Suspensions", New Journal of Glass and Ceramics, 2014, 4, pp. 29-37.

Zaccone, A., et al., "Shear-Driven Solidification of Dilute Colloidal Suspensions", Phys. Rev. Lett. 106, 138301 (2011), Mar. 29, 2011.

Martin, Justin J., et al., "Mixing Silica in Natural Rubber: Impact of Surface Treatment and Mixing Parameters on Performance, Throughput and Energy Use", Rubber World—Nov. 2014, pp. 22-39.

Martínez-Pedrero, F., et al., "Making an Elastomeric Composite Material via the Heteroaggregation of aBinaiy Colloidal Dispersion", Soft Matter 2012, 8, pp. 8752-8758.

Chapman, Andrew V., et al., "Microdispersion of Silica in Tire Tread Compounds Based on Epoxidized Natural Rubber", Fall 176th Technical Meeting of the Rubber Division of the American Chemical Society, Inc., Pittsburg, PA, Oct. 12-15, 2009.

* cited by examiner

METHODS OF MAKING AN ELASTOMER COMPOSITE REINFORCED WITH SILICA AND CARBON BLACK AND PRODUCTS CONTAINING SAME

The present invention relates to methods of making particle reinforced elastomer composites. More particularly, the present invention relates to a particle reinforced elastomer composite formed by a wet masterbatch method.

Numerous products of commercial significance are formed of elastomeric compositions wherein particulate reinforcing material is dispersed in any of various synthetic elastomers, natural rubber or elastomer blends. Carbon black and silica, for example, are widely used as reinforcing agents in natural rubber and other elastomers. It is common to produce a masterbatch, that is, a premixture of reinforcing material, elastomer, and various optional additives, such as extender oil. Numerous products of commercial significance are formed of such elastomeric compositions. Such products include, for example, vehicle tires wherein different elastomeric compositions may be used for the tread portion, sidewalls, wire skim and carcass. Other products include, for example, engine mount bushings, conveyor belts, windshield wipers, seals, liners, wheels, bumpers, and the like.

Good dispersion of particulate reinforcing agents in rubber compounds has been recognized for some time as one of the most important objectives for achieving good quality and consistent product performance, and considerable effort has been devoted to the development of methods to improve dispersion quality. Masterbatch and other mixing operations have a direct impact on mixing efficiency and on dispersion quality. In general, for instance, when carbon black is employed to reinforce rubber, acceptable carbon black macro-dispersions can often be achieved in a dry-mixed masterbatch. However, high quality, uniform dispersion of silica by dry-mix processes poses difficulties, and various solutions have been offered by the industry to address this problem, such as precipitated silica in the form of "highly dispersible silica" or "HDS" flowable granules. More intensive mixing can improve silica dispersion, but also can degrade the elastomer into which the filler is being dispersed. This is especially problematic in the case of natural rubber, which is highly susceptible to mechanical/thermal degradation.

In addition to dry mixing techniques, it is known to feed elastomer latex or polymer solution and a carbon black or silica slurry to an agitated tank. Such "wet masterbatch" techniques can be used with natural rubber latex and emulsified synthetic elastomers, such as styrene butadiene rubber (SBR). However, while this wet technique has shown promise when the filler is carbon black, this wet technique, when the filler is silica, poses challenges to achieving acceptable elastomer composite. Specific techniques for producing wet masterbatch, such as the one disclosed in U.S. Pat. No. 6,048,923, the contents of which are incorporated by reference herein, have not been effective for producing elastomer composites employing silica particles as the sole or principal reinforcing agent.

Accordingly, there is a need to improve methods that incorporate silica and carbon black in elastomer composites in a wet masterbatch process, such as one that makes use of combining two fluids together under continuous, high energy impact conditions, so as to achieve an acceptable elastomer composite comprising silica particles as the sole or principal reinforcing agent.

SUMMARY OF THE PRESENT INVENTION

A feature of the present invention is to provide methods to produce elastomer composites using a wet masterbatch process which permits the use of silica and carbon black, and yet achieves desirable particle reinforced elastomer composites.

To achieve these and other advantages, and in accordance with the purposes of the present invention, as embodied and broadly described herein, the present invention relates to the controlled and selective placement or introduction of silica and carbon black in a wet masterbatch process that forms a particle reinforced elastomer composite.

The present invention further relates to a method of making an elastomer composite in a wet masterbatch process that includes, but is not limited to, the use of a fluid that includes an elastomer latex, and the use of an additional fluid that includes a destabilized dispersion of particulate silica and carbon black. The 'additional fluid' is provided either as i) two streams comprising a dispersion comprising carbon black and a destabilized dispersion comprising silica; or ii) a single stream comprising a dispersion comprising carbon black and a destabilized dispersion comprising silica; or iii) a destabilized dispersion comprising silica and carbon black. The two fluids are combined together under continuous flow conditions and selected velocities. The combining is such that the silica and carbon black are dispersed within the elastomer latex and, in parallel (or almost parallel), the elastomer latex is transformed from a liquid to a solid or semi-solid elastomer composite, such as to a solid or semi-solid silica-containing continuous rubber phase. This can occur, for instance, in about two seconds or less such as a fraction of a second, due to the one fluid impacting the other fluid with sufficient energy to cause the uniform and intimate distribution of silica and carbon black particles in the elastomer. The use of a destabilized dispersion of silica in this masterbatch process enables formation of an elastomer composite with desirable properties.

The present invention further relates to elastomer composites formed from any one or more of the processes of the present invention. The present invention also relates to articles that are made from or include the elastomer composite(s) of the present invention.

It is to be understood that both the foregoing general description and the following detailed description are exemplary and explanatory only and are intended to provide a further explanation of the present invention as claimed.

The accompanying drawings, which are incorporated in and constitute a part of this application, illustrate various features of the present invention and, together with the description, serve to explain the principles of the present invention.

DETAILED DESCRIPTION OF THE PRESENT INVENTION

Figure 1:
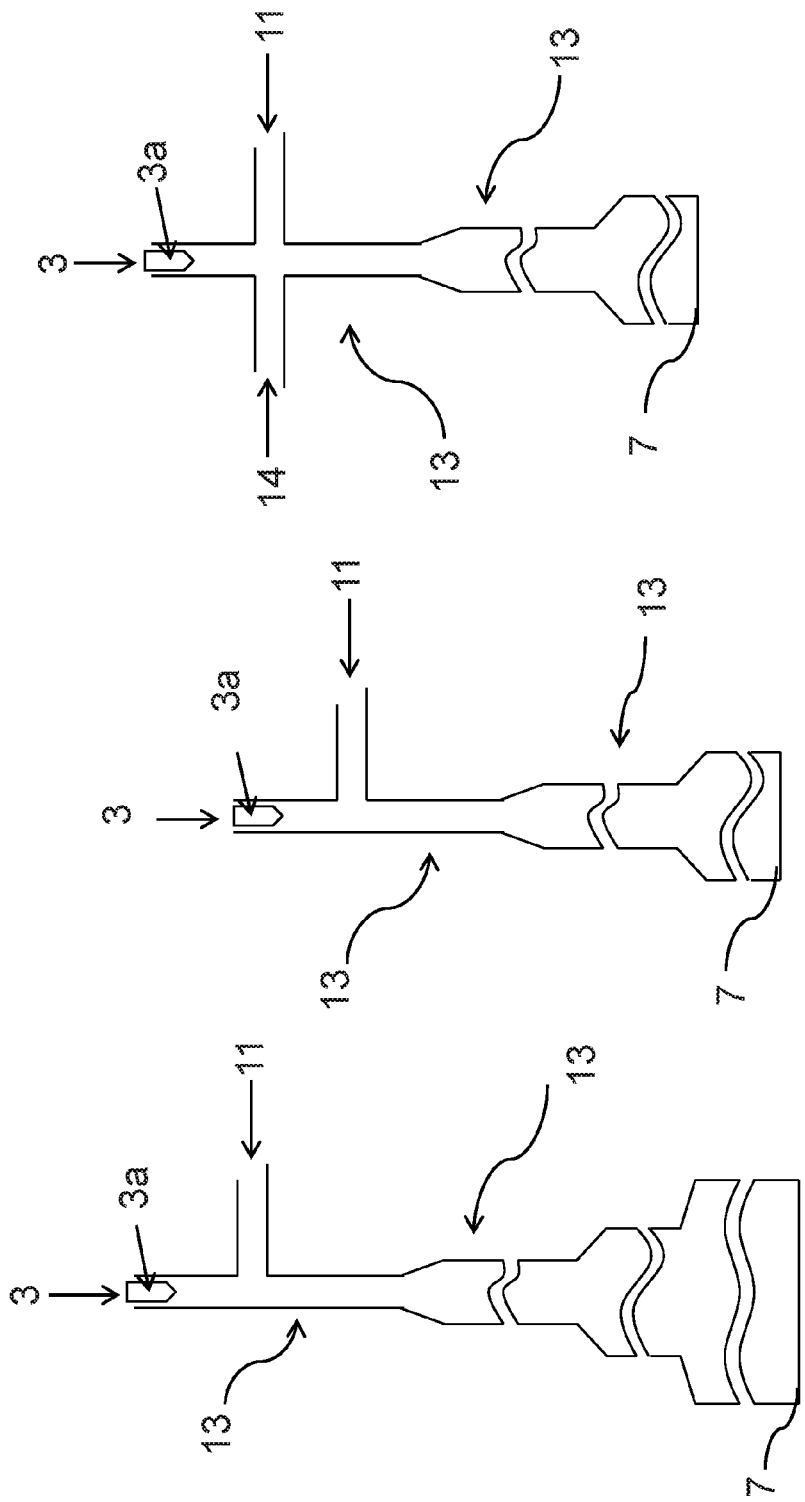
FIG. 1A illustrates an exemplary mixing apparatus in accordance with Process A-1.
FIG. 1B illustrates an exemplary mixing apparatus in accordance with Process B.
FIG. 1C illustrates an exemplary mixing apparatus having an additional inlet, in accordance with Process B.

The present invention relates to the selective and strategic introduction of silica as well as carbon black into an elastomer latex in a continuous, rapid, wet masterbatch process. This process can be carried out in a semi-confined reaction zone, such as a tubular mixing chamber or other mixing chamber of an apparatus suitable for carrying out such a process under controlled volumetric flow and velocity parameters, leading to beneficial properties that would not be achieved, but for this selective and strategic use of especially silica. As explained in further detail herein, by 'selective', the present invention uses a destabilized dispersion of silica. And, by 'strategic' introduction, the present invention uses at least two separate fluids, one fluid that includes an elastomer latex, and another fluid that includes the destabilized dispersion of silica and carbon black. The two fluids can be pumped or transferred into a reaction zone, such as a semi-confined reaction zone. The two fluids can be combined under continuous flow conditions, and under selected volumetric flow and velocity conditions. The combining under pressure with selected differential velocity conditions is sufficiently energetic that the silica and carbon black can be distributed in two seconds or less, such as in milliseconds, within the elastomer latex, and the elastomer latex is transformed from a liquid to a solid phase, such as to a particle reinforced elastomer composite in the form of a solid or semi-solid silica and carbon black-containing continuous rubber phase.

The present invention relates in part, to a method of producing a silica elastomer composite, comprising, consisting essentially of, consisting of, or including:

(a) providing a continuous flow under pressure of at least a first fluid comprising a destabilized dispersion of particles (e.g., silica and carbon black) and providing a continuous flow of a second fluid comprising elastomer latex;

(b) adjusting volumetric flows of the first fluid and the second fluid to yield an elastomer composite having a silica content of from about 15 phr to about 180 phr; and (c) combining the first fluid flow and the second fluid flow (for instance in a semi-confined reaction zone) with sufficient impact to distribute the silica and carbon black within the elastomer latex, to obtain a flow of a solid silica and carbon black-containing continuous rubber phase or semi-solid silica and carbon black-containing continuous rubber phase. The method transforms the elastomer latex from a liquid to a flow of a solid or semi-solid silica and carbon black-containing continuous rubber phase. The silica and carbon black-containing continuous rubber phase can be recovered as a substantially continuous flow of the solid or semi-solid silica and carbon black-containing continuous rubber phase. With regards to (a) the first fluid, the first fluid can be provided either as i) two streams comprising a dispersion comprising carbon black and a destabilized dispersion comprising silica; or ii) a single stream comprising a dispersion comprising carbon black and a destabilized dispersion comprising silica; or iii) a destabilized dispersion comprising silica and carbon black. Further details and/or options for the methods of the present invention are described below. Also, further variations of i), ii), and iii) are also provided below in detail.

As used herein, "silica" means particulate silicon dioxide, or a particle coated with silicon dioxide, and includes precipitated silica in any form, such as highly dispersible (HDS) granules, non-HDS granules, silica aggregates and silica particles; colloidal silica; fumed silica; and any combinations thereof. Such silicon dioxide or silicon dioxide coated particles may have been chemically treated to include functional groups bonded (attached (e.g., chemically attached) or adhered (e.g., adsorbed)) to the silica surface. Thus, "silica" includes any particle having a surface substantially consisting of silica or silica having functional groups bonded or attached to it.

As used herein, "dispersion" means a stable suspension of solid particles in aqueous fluid, wherein the charge at the surface of the particles prevents particle agglomeration and the dispersion is characterized by a zeta potential magnitude of greater than or equal to 30 mV.

Zeta potential is used to measure stability of charged particles, such as silica particles, dispersed in a fluid. Measurement of zeta potential can have a variance of, for instance +/−2 mV, and, as used herein, zeta potential magnitude refers to the absolute value of the number, e.g., a zeta potential value of minus 30 mV has a greater magnitude than a zeta potential value of minus 10 mV.

As used herein, "destabilized dispersion" means a suspension of solid particles in an aqueous fluid wherein the charge at the surface of the particles has been reduced by the presence of an agent, or by treatment of the solid particles, and is characterized by a zeta potential magnitude of less than 30 mV, or more preferably a zeta potential of less than 28 mV or less than 25 mV. The aqueous fluid can be water, a water miscible fluid (e.g., alcohol or ether), partially water miscible fluid, or a mixture of fluids that contains at least a water miscible or partially water miscible fluid.

As used herein, the terms "silica slurry" and "dispersion" mean a dispersion of silica (that may also include carbon black) in an aqueous fluid, wherein the charge at the surface of the silica prevents particle agglomeration and the dispersion is characterized by a zeta potential value with a magnitude of at least 30 mV. A silica slurry or dispersion may be destabilized by treatment with sufficient agent(s), or by treatment of the silica, to reduce the charge on the surface of the silica and the resulting destabilized silica slurry (or destabilized silica dispersion) is characterized by a zeta potential magnitude of less than 30 mV.

As used herein, the terms "uniform" and "uniformly" are intended to mean, conventionally for those skilled in the art, that the concentration of a component, for example, particulate filler, in any given fraction or percentage (e.g., 5%) of a volume is the same (e.g., within 2%) as the concentration of that component in the total volume of the material in question, e.g., elastomer composite or dispersion. Those skilled in the art will be able to verify the statistical uniformity of the material, if required, by means of measurements of concentration of the component using several samples taken from various locations (for example near the surface or deeper in the bulk).

As used herein, a "silica elastomer composite" means a masterbatch (a premixture of reinforcing material (that may include carbon black), elastomer, and various optional additives, such as extender oil) of coherent rubber comprising a reinforcing amount (e.g., about 15 phr to about 180 phr) of dispersed silica. Silica elastomer composite can contain optional, further components such as acid, salt, antioxidant, antidegradants, coupling agents, minor amounts (e.g., 10 wt % or less of total particulates) of other particulates, processing aids, and/or extender oil, or any combinations thereof.

As used herein, a "solid silica and carbon black-containing continuous rubber phase" or "particle containing continuous rubber phase" means a composite having a continuous rubber phase and a uniformly dispersed phase of reinforcing particles (e.g., silica and carbon black) and, for instance, up to 90%, by weight, aqueous fluid. The solid silica and carbon black-containing continuous rubber phase may be in the form of a continuous rope or worm. When compressed these articles release water. The solid silica and carbon black-containing continuous rubber phase can contain optional, further components such as acid, salt, antioxidant, coupling agents, minor amounts of other particulates (e.g., 10 wt % or less of total particulates), and/or processing oil, or any combinations thereof.

As used herein, a "semi-solid silica and carbon black-containing continuous rubber phase" means a composite with a paste-like consistency, having a silica and carbon black—containing, continuous rubber phase. The semi-solid product has a continuous phase of rubber, with entrapped silica and carbon black uniformly distributed throughout the rubber phase. The semi-solid silica and carbon black-containing continuous rubber phase remains coherent and expels water, while retaining solids content, upon further handling in one or more subsequent operations selected to develop the paste-like or gel-like material into a solid silica and carbon black-containing continuous rubber phase.

As used herein, a "coherent" material is material existing in a substantially unitary form that has been created by the adhesion of many smaller parts, such as an elastic, solid mass of rubber created by the adhesion of many small rubber particles to each other.

As used herein, a "continuous flow" is a steady or constant flow of a fluid without interruption from a supply source (e.g., tank). But, it is to be understood that temporary interruptions (e.g., a second or a few minutes) of flow would still be considered a continuous flow (e.g., for instance, when switching supply from various supply holding areas, such as tanks and the like, or interrupting flows to accommodate downstream unit processes or maintenance of the equipment).

Figure 3:
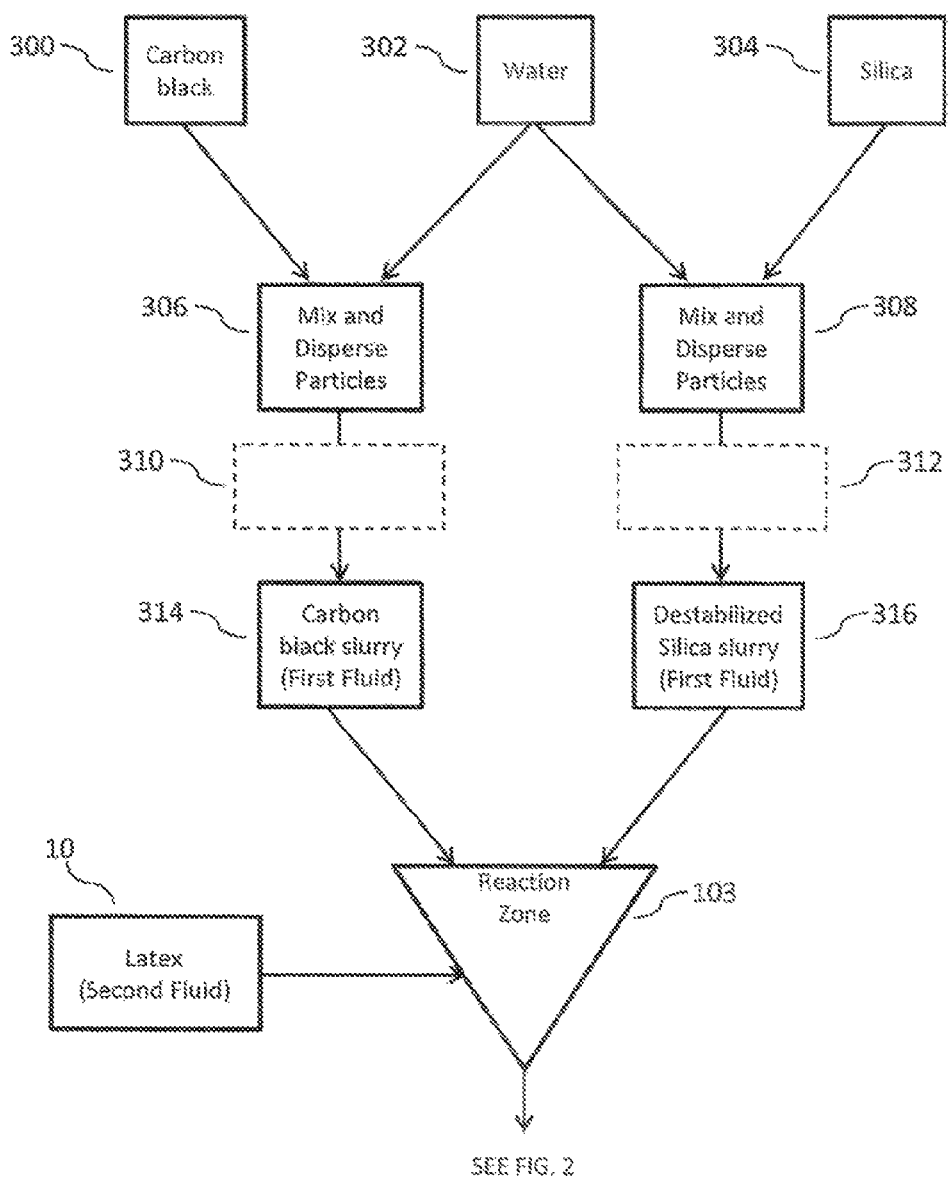
FIG. 3 is a block diagram of a process outlining the various steps that can occur in the formation of the dispersion containing the silica and carbon black for use in the mixing apparatuses that can be used in the present invention.

FIGS. 3 through 7 provide various examples of processes that can be used to prepare a destabilized dispersion that contains silica along with carbon black. These exemplified processes are not exhaustive of the various processes that can be implemented using the methods of the present invention. In FIG. 3, carbon black 300 (e.g., in pellet or particulate form) is combined with a water or aqueous fluid 302 to form a carbon black slurry 306. The carbon black slurry can then be subjected to one or more agitation and/or milling and/or grinding and/or other mechanical processing step(s), other non-mechanical processing steps as denoted by box 310. The boxes designated by dashed lines in the figures are optional steps or processes that can be used. Generally, with the one or more processing steps 310, a carbon black slurry 314 that is a uniformly dispersed carbon black slurry that is substantially free of larger agglomerated particles is obtained. Parallel with these steps, water or aqueous fluid 302, from the same source or different source as for the carbon black, is combined with silica 304 to form a silica slurry 308. The silica slurry can be subjected to various processing steps such as milling, and/or agitation, and/or grinding, and/or other mechanical and/or non-mechanical processing step(s), as well as other steps described herein to result in a destabilized dispersion that contains or includes silica. As disclosed herein, the additional step(s) 312 can include the addition of at least one acid and/or salt to form the destabilized silica dispersion 316. Then, the carbon black slurry and the destabilized silica slurry can be considered the "first fluid" for purposes of the present invention, but as shown in FIG. 3, slurries are added as two separate streams to the reaction zone 103: one stream containing the dispersion comprising the carbon black and the other stream containing the destabilized dispersion comprising silica. The manner in which the two streams are introduced into the reaction zone 103 can be with the same volumetric flow rates or different volumetric flow rates, and/or with the same or different parameters and/or the same or different pressures. As shown in FIG. 3 and as described in the present application, the second fluid which comprises the elastomer latex 105 is also introduced into the reaction zone 103.

Figure 4:
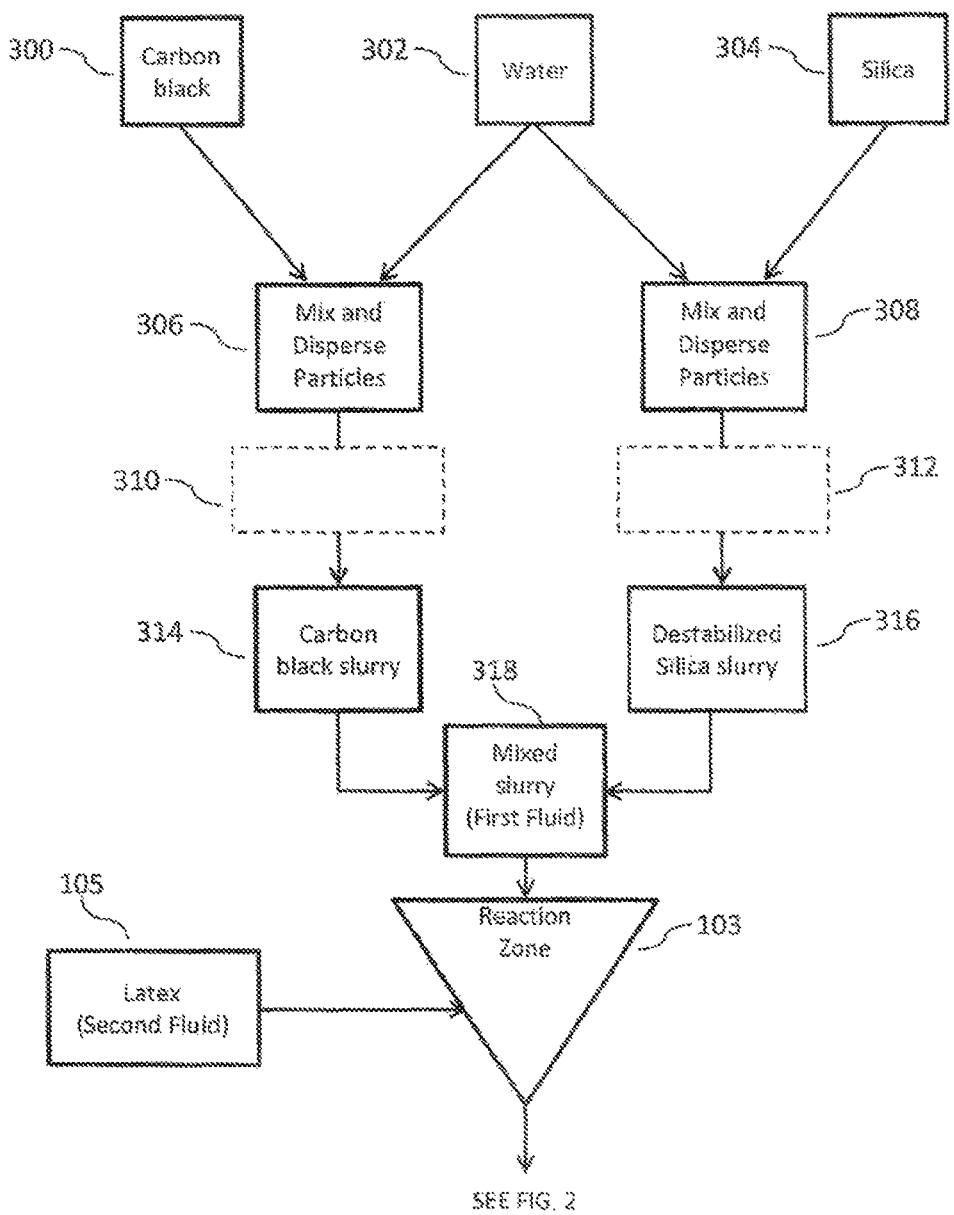
FIG. 4 is a block diagram of another process outlining the various steps that can occur in the formation of the dispersion containing the silica and carbon black for use in the mixing apparatuses that can be used in the present invention.

As another option, as depicted in FIG. 4, a variation of the process of FIG. 3 can be used. For purposes of the figures, the same reference numbers denote the same description from FIG. 3 unless otherwise indicated. As shown in FIG. 4, carbon black 300 is combined with water or an aqueous fluid 302 to form a carbon black slurry 306. Further, water or an aqueous fluid 302 from the same or different source, is combined with silica 304 to form a silica slurry 308. Further processing steps for the carbon black can occur as depicted by box 310 and further processing of the silica slurry to result in a destabilized silica slurry can occur as shown in box 312. Unlike FIG. 3, instead of using two separate streams to introduce the carbon black slurry and the silica slurry into the reaction zone 103, in one option, as shown in FIG. 4, the carbon black slurry and the destabilized dispersion comprising silica are combined prior to the reaction zone 103, so as to form a single stream 318 which is identified as a mixed slurry (e.g., a destabilized particle dispersion) which is then introduced into the reaction zone 103.

Figure 5:
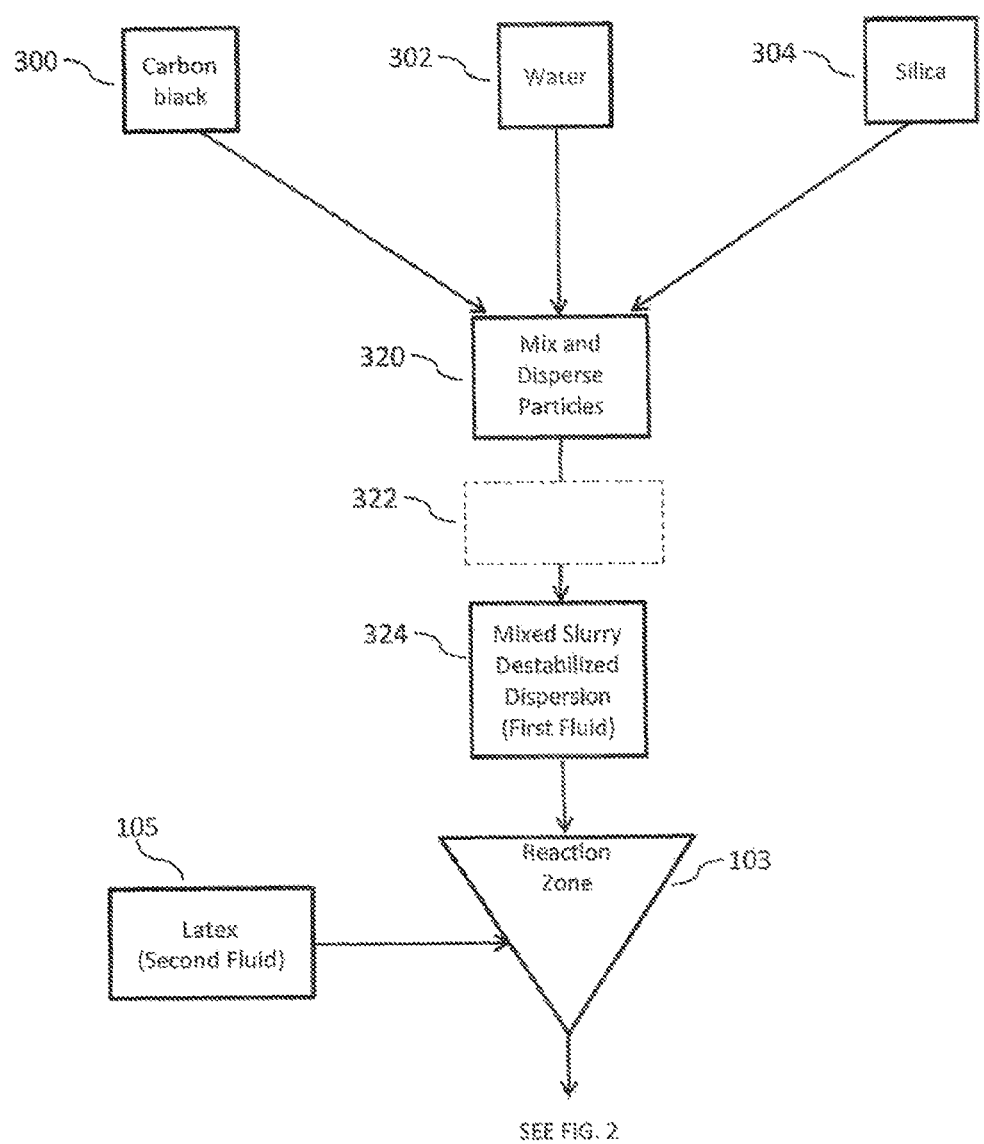
FIG. 5 is a block diagram of another process outlining the various steps that can occur in the formation of the dispersion containing the silica and carbon black for use in the mixing apparatuses that can be used in the present invention.

In FIG. 5, an option is shown where carbon black 300 and water or aqueous fluid 302 are combined along with silica 304, all in a single tank 320 to form a slurry comprising carbon black and silica. The mixed slurry 320 can then optionally be subjected to further processing that can include milling, grinding, fluidizing, agitation, and/or other processing steps to cause the destabilization of the slurry with the silica present, such as the addition of at least one acid and/or salt. It is noted that since the mixed slurry includes carbon black, the amount of destabilization may be less than would be desired for a dispersion that contains an equivalent quantity of silica without the carbon black. The mixed slurry 324 (e.g., destabilized particle dispersion) can then be introduced into the reaction zone 103.

Figure 6:
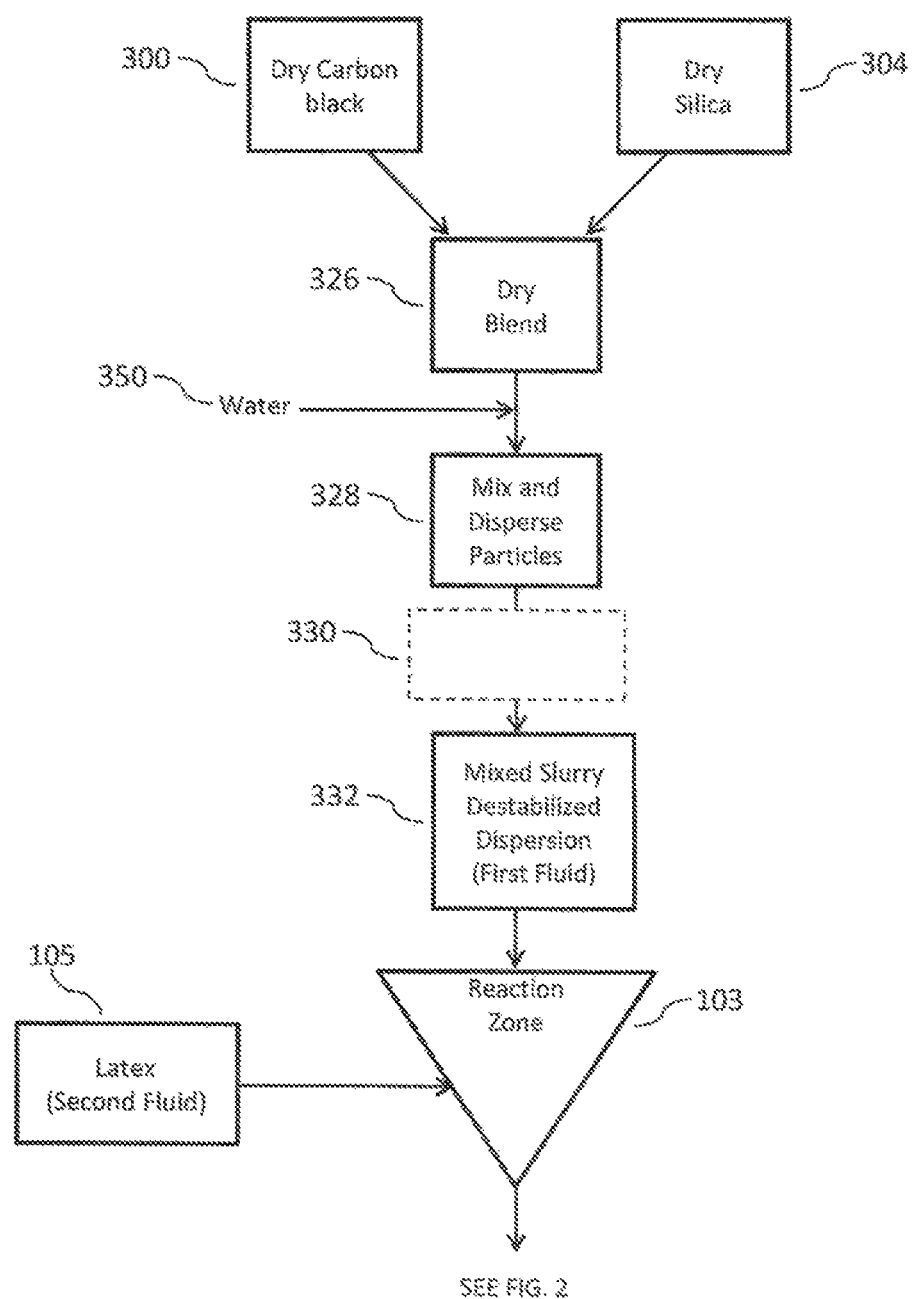
FIG. 6 is a block diagram of another process outlining the various steps that can occur in the formation of the dispersion containing the silica and carbon black for use in the mixing apparatuses that can be used in the present invention.

In FIG. 6, carbon black 300 and silica 304 are combined to form a dry mixture of the two components 326 and then this dry mixture 326 is combined with water or aqueous fluid 350 to form a wet mixture 328, which then can be subjected to further processing steps 330, which would be the same steps as in FIG. 5 for processing step 322. This then forms a mixed well dispersed slurry 332 (e.g., a destabilized particle dispersion) which can then be introduced into the reaction zone 103.

Figure 7:
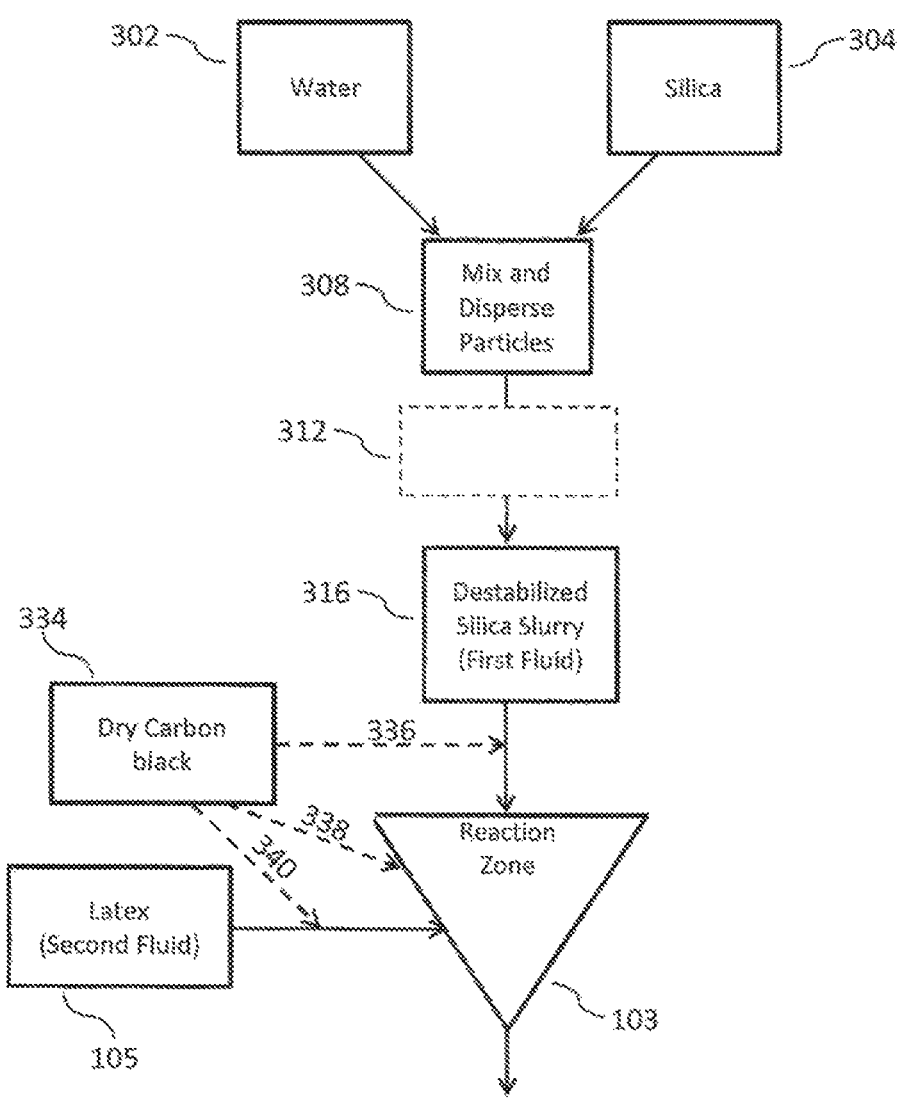
FIG. 7 is a block diagram of another process outlining the various steps that can occur in the formation of the dispersion containing the silica and carbon black for use in the mixing apparatuses that can be used in the present invention.

In FIG. 7, silica 304 is combined with water or aqueous fluid 302 to form a silica slurry 308 which is then subjected to further processing steps 312 as described in FIG. 3. This dispersion comprising silica 316 (e.g., destabilized silica dispersion) can then be introduced into the reaction zone 103. Then, dry carbon black in particulate form can be injected or otherwise introduced either into the dispersion comprising the silica 316 prior to its introduction into the reaction zone 103 or can be separately introduced 338, e.g., carbon black fluidized in a stream of air, into the reaction zone 103 while the destabilized dispersion comprising silica 316 is introduced into the reaction zone 103 or the carbon black can be introduced to the latex flow 340.

The weight ratio (or based on a total filler weight basis) of silica to carbon for any of the processes of the present invention can be from about 45:55, or 50:50 (silica:carbon black) to less than 90:10, or 89.9:10, or from 50:50 to 89:11, or from 60:40 to 85:15 or from 70:30 to 80:20.

The elastomer composite can be produced in a continuous flow process involving a liquid mixture of elastomer latex and destabilized dispersion of silica (that may include carbon black). Any device, or apparatus or system can be used, provided the device, apparatus, or system can be operated such that a liquid mixture of elastomer latex and a destabilized silica dispersion (that may include carbon black) can be combined under continuous flow conditions and under controlled volumetric flow, pressure, and velocity conditions, including, but not limited to, the apparatus shown in FIG. 1A, 1B, or 1C, or any type of eductor or ejector, or any other device arranged to combine a continuous flow of at least two flows of liquid under controlled volumetric flow, pressure, and velocity conditions into and through a reaction zone. The apparatus described in US20110021664, U.S. Pat. No. 6,048,923, WO2011034589, WO2011034587, US20140316058, and WO2014110499 (each incorporated in their entirety by reference) can be used or adapted to the processes herein as well. Also, ejectors and eductors or syphons such as water jet eductors or steam jet syphons can be used (e.g., ones commercially available from Schutte & Koerting, Trevose, Pa.).

The apparatus can include various supply tanks, pipes, valves, meters and pumps to control volumetric flow, pressure, and velocity. Further, as indicated at inlet (3) in FIGS. 1A, 1B, and 1C, various types and sizes of nozzles or other orifice size control elements (3a) can be employed to control the velocity of the silica slurry. The volumetric dimension of the reaction zone (13) can be selected to provide desired volumetric flows of the fluids and the elastomer composite. The inlet (11) supplying the elastomer latex to the reaction zone may be tapered to provide different volumetric flow rates and velocities. Devices may include an inlet (11) of uniform diameter, without any taper at the orifice leading to the reaction zone.

In the method, a fluid that includes an elastomer latex and an additional fluid that includes a destabilized dispersion of silica and carbon black supplied as one stream or separate streams, for instance, as a jet under pressure are combined together under continuous flow conditions and under selected volumetric flow rates, pressure, and velocities to rapidly and intimately mix the two fluids. The combining, for instance in a semi-confined space under pressure, is such that the silica and carbon black are distributed throughout the elastomer latex and, in parallel, the elastomer latex is transformed from a liquid to a solid or semi-solid phase, i.e., a liquid to solid inversion, or coagulation, of the latex occurs, capturing the distributed silica and carbon black and water in the rubber and forming a solid or semi-solid silica and carbon black-containing continuous rubber phase in a continuous or semi-continuous flow out of the reaction zone (e.g., from opening at outlet (7) in FIGS. 1A-1C)). At this point, the product can be considered an elastomer composite of a continuous rubber phase containing silica particles, a silica-containing coherent rubber, or a particle reinforced elastomer composite. It is believed that the silica and carbon black particles first must be distributed in the elastomer latex to obtain the desired product, and the liquid to solid phase inversion follows immediately upon the silica and carbon black distribution. However, with the continuous and extremely rapid rate of combining the fluids (i.e., less than 2 seconds, less than 1 second, less than 0.5 second, less than 0.25 second, less than 0.1 second, or on the order of milliseconds), and the energetic and intimate mixing of relatively small volumes of fluids in the reaction zone (e.g., fluid volumes on the order of 10 to 500 cc), the parallel steps of distribution of the silica and carbon black particles and liquid to solid phase transformation of the elastomer latex can happen nearly simultaneously. The 'reaction zone' as used herein is the zone where the intimate mixing occurs along with coagulation of the mixture. The mixture moves through the reaction zone and to outlet (7).

An exemplary method for preparing the elastomer composite involves simultaneously feeding a first fluid comprising a destabilized dispersion of silica and carbon black (supplied as one stream or as two separate streams) and a second fluid comprising an elastomer latex (e.g. natural rubber latex) fluid to a reaction zone. The first fluid comprising the destabilized dispersion of silica and carbon black can be fed at a flow rate based on its volume, and the second fluid comprising the elastomer latex can be fed at a flow rate based on its volume (i.e., volumetric flow rates). The volumetric flows of either the first fluid, the second fluid, or both the first and second fluid can be adjusted or provided so as to yield an elastomer composite having a silica content of from 15 to 180 parts per hundred weight rubber (phr) (e.g., from 35 to 180 phr, from 20 phr to 150 phr, from 25 phr to 125 phr, from 25 phr to 100 phr, from 35 to 115 phr, or from 40 phr to 115 phr, or from 40 phr to 90 phr and the like). The fluid that contains the destabilized dispersion of particles (e.g. silica and carbon black) may be referred to as the first fluid in some embodiments herein. This fluid is a separate fluid from the fluid containing the elastomer latex. Either fluid can be introduced through one inlet or injection point or through more than one inlet or injection point.

The volumetric flow ratio of the first fluid (fluid that contains at least the destabilized silica dispersion and carbon black) to the second fluid (latex fluid) can be adjusted to permit the desired elastomer composite to form. Examples of such volumetric flow ratios include, but are not limited to, a volumetric ratio of from 0.4:1 (first fluid to second fluid) to 3.2:1; from 0.2:1 to 2:1 and the like. The volumetric flow ratio between the first fluid and second fluid can be adjusted by any means or technique. For instance, the volumetric flow rate of the first or second fluid or both can be adjusted by a) increasing the volumetric flow rate, b) decreasing the volumetric flow rate, and/or c) adjusting the flow rates of the fluids relative to each other. Pressure created by physical constraints applied to the flow of the first fluid causes formation of a high velocity jet that enables the combination of the destabilized silica dispersion with the elastomer latex to occur rapidly, e.g., in a fraction of a second. As an example, the time during which two fluids are mixed and a liquid to solid phase inversion occurs can be on the order of milliseconds (e.g., about 50 ms to about 1500 ms or about 100 ms to about 1000 ms). For a given selection of fluids, if the velocity of the first fluid is too slow to adequately mix the fluids, or the residence time is too short, then a solid rubber phase and solid product flow may not develop. If the duration of the process is too long, back pressure may develop in the reaction zone and the continuous flow of materials halted. Likewise, if the velocity of the first fluid is too fast, and the duration of the process is too short, a solid rubber phase and solid product flow may not develop.

As described earlier, the relative volumetric flows of the first fluid (destabilized silica and carbon black slurry as a combined stream or as two separate streams) and the second fluid (latex) can be adjusted, and when at least one salt is used as the destabilization agent, it is preferred to adjust the volumetric flow ratio of destabilized particle slurry to elastomer latex so as to be 0.4:1 to 3.2:1. Other flow ratios may be used.

When at least one acid is used as the destabilization agent, it is preferred to adjust the volumetric flow ratio of destabilized silica slurry (or destabilized particle slurry) to elastomer latex so as to be 0.2:1 to 2:1. Other flow ratios may be used.

The elastomer latex can contain at least one base (such as ammonia), and the destabilized dispersion of silica (or destabilized particle dispersion) can be achieved with the addition of at least one acid, wherein the molar ratio of the acid in the first fluid (silica) and the base (e.g., ammonia) in the second fluid (latex) is at least 1.0, or at least 1.1, or at least 1.2, such as from 1 to 2 or 1.5 to 4.5. The base can be present in a variety of amounts in the elastomer latex, such as, but not limited to, 0.3 wt % to about 0.7 wt % (based on the total weight of the elastomer latex), or other amounts below or above this range.

The destabilized particle dispersion as one stream or as two separate streams, can be fed to the reaction zone preferably as a continuous, high velocity, e.g., about 6 m/s to about 250 m/s, or about 30 m/s to about 200 m/s, or about 10 m/s to about 150 m/s, or about 6 m/s to about 200 m/s, jet of injected fluid, and the fluid containing the elastomer latex can be fed at a relatively lower velocity, e.g., about 0.4 m/s to about 11 m/s, or about 0.4 m/s to about 5 m/s, or about 1.9 m/s to about 11 m/s, or about 1 m/s to about 10 m/s or about 1 m/s to about 5 m/s. The velocities of the fluids are chosen for optimizing mixing between fluids and fast coagulation of elastomer latex. The velocity of the elastomer latex fed into the reaction zone should be preferably high enough to generate turbulent flow for better mixing with destabilized particle slurry. Yet, the velocity of the elastomer latex should be kept low enough so that latex would not coagulate from shear before it is well mixed with the destabilized particle slurry. In addition, the velocity of the elastomer latex should be kept low enough before it enters into the reaction zone for preventing clogging of latex supply lines from coagulation of latex due to high shear. Similarly, there is also an optimized range of the velocity of destabilized particle dispersion. It is theorized that if the velocity of the destabilized particle slurry is too high, the rate of shear induced agglomeration of silica particles could be too high to allow adequate, uniform mixing between silica particles (and carbon black) and elastomer latex particles.

While in this present invention, silica and carbon black are mixed with the latex, the silica is generally the particle that requires destabilization in this process from the standpoint of achieving the desirable solid or semi-solid continuous rubber phase. Thus, some of the discussion here focuses on silica and its destabilization with the realization that this would apply equally to particle dispersions that include not just silica but also carbon black.

Shear thickening from agglomeration and networking of silica particles also could reduce turbulence of the destabilized silica slurry and adversely affect the mixing between silica and latex. On the other hand, if the velocity of the destabilized silica slurry is too low, there may not be sufficient mixing between silica particles and elastomer latex particles. Preferably, at least one of the fluids entering into the reaction zone has a turbulent flow. In general, due to much higher viscosity of a typical destabilized silica dispersion relative to a typical elastomer latex, a much higher velocity of the destabilized silica dispersion is needed for generating good fluid dynamics for mixing with the elastomer latex and fast coagulation of the latex. Such high velocity flow of the destabilized silica dispersion may induce cavitation in the reaction zone to enhance rapid mixing of fluids and distribution of silica particles in the elastomer latex. The velocity of the destabilized silica dispersion can be altered by using different volumetric flow rates, or a different nozzle or tip (3a) (wider or narrower in diameter) at the inlet (3) that feeds the first fluid comprising destabilized silica dispersion. With use of a nozzle to increase the velocity of the destabilized silica dispersion, it can be provided under pressure ranging from about 30 psi to about 3,000 psi, or about 30 psi to about 200 psi, or about 200 psi to about 3,000 psi, or about 500 psi to about 2,000 psi or a relative pressure at least 2 times higher than the pressure applied to the fluid containing the elastomer latex, or 2 to 100 times higher. The second fluid of elastomer latex can be provided, as an example, at a pressure ranging from about 20 psi to about 30 psi. The pressure in the first fluid supply system may be up to about 500 psi.

Based on the production variables described herein, such as the velocity of the destabilized particle slurry fluid, the velocity of the latex fluid, the relative flow rates of the destabilized particle slurry and latex fluids, the concentration of the destabilizing agent such as a salt and/or acid, the silica concentration in the destabilized slurry, the rubber weight percent in the latex, the ammonia concentration in the latex, and/or the acid (if present) to ammonia ratio, it is possible to control, obtain, and/or predict formation of a solid or semi-solid silica-containing continuous rubber phase over a range of desired silica contents. Thus, the process can be operated over an optimized range of variables. Thus, the a) velocity of one or both fluids, b) the volumetric flow ratio of the fluids, c) the destabilized nature of the silica, d) particulate silica concentration, e.g., 6 to 35 weight percent, of the destabilized silica dispersion, and e) the dry rubber content, e.g., 10 to 70 weight percent, of the latex, can permit mixing under high impact conditions so as to cause a liquid to solid inversion of the elastomer latex and uniformly disperse the silica in the latex at a selected silica to rubber ratio, and thus form a flow of a solid or semi-solid silica-containing continuous rubber phase. The recovery of the flow of solid or semi-solid silica-containing continuous rubber phase can be achieved in any conventional technique for recovery of a solid or semi-solid flow of material. The recovery can permit the solid or semi-solid flow to enter into a container or tank or other holding device. Such container or holding tank may contain a solution of salt or acid or both to effect further coagulation of the product to a more elastic state. For example, the recovering can be transporting or pumping the solid flow to other processing areas or devices for further processing, of which some options are described herein. The recovering can be continuous, semi-continuous, or by batch. The outflow end of the reaction zone preferably is semi-confined and open to the atmosphere, and the flow of solid or semi-solid elastomer composite is preferably recovered at ambient pressure to allow continuous operation of the process.

The flow of a solid silica and carbon black-containing continuous rubber phase can be in the form of more or less elastic, rope-like "worms" or globules. The solid silica and carbon black-containing continuous rubber phase may be capable of being stretched to 130-150% of its original length without breaking. In other cases, a semi-solid silica and carbon black-containing continuous rubber phase can be in the form of non-elastic, viscous paste or gel-like material that can develop elastic properties. In each case, the output is a coherent, flowing solid whose consistency can be highly elastic or slightly elastic and viscous. The output from the reaction zone can be a substantially constant flow concurrent with the on-going feeding of the elastomer latex and the destabilized dispersion of silica fluids into the reaction zone. Steps in the process, such as the preparation of the fluids, may be done as continuous, semi-continuous, or batch operations. The resulting solid or semi-solid silica and carbon black-containing continuous rubber phase can be subjected to subsequent further processing steps, including continuous, semi-continuous, or batch operations.

The solid or semi-solid silica and carbon black-containing continuous rubber phase created in the process contains water, or other aqueous fluid, and solutes from the original fluids, and, for instance, can contain from about 40 wt % to about 95 wt % water, or 40 wt % to about 90 wt % water, or from about 45 wt % to about 90 wt % water, or from about 50 to about 85 wt % water content, or from about 60 to about 80 wt % water, based on the total weight of the flow of particle reinforced elastomer composite. As an option, after forming the solid or semi-solid silica and carbon black-containing rubber phase comprising such water contents, this product can be subjected to suitable de-watering and masticating steps and compounding steps to develop desired rubber properties and fabricate rubber compounds. Further details of the process and other post-processing steps are set forth below and can be used in any embodiment of the present invention.

A semi-solid silica and carbon black-containing continuous rubber phase may be converted to a solid silica and carbon black-containing continuous rubber phase. This for instance can be done by subjecting the semi-solid silica and carbon black-containing continuous rubber phase to mechanical steps that remove water from the composite and/or having the semi-solid material sit for a time (e.g., after recovery from the reaction zone in an offline location) for instance, 10 minutes to 24 hours or more; and/or heating the semi-solid silica and carbon black-containing continuous rubber phase to remove water content (e.g., a temperature of from about 50° C. to about 200° C.); and/or subjecting the semi-solid material to acid or additional acid such as in an acid bath, or to salt or additional salt, or a salt bath, or to a combination of acid and salt, and the like. One or more or all of these steps can be used. In fact, one or more or all of steps can be used as a further processing step(s) even when a solid silica and carbon black-containing continuous rubber phase is initially or subsequently recovered.

The degree of destabilization of the silica slurry, at least in part, determines the amount of silica that can be present in the silica elastomer composite (e.g., captured and distributed uniformly within the composite) for a given silica concentration in the silica slurry and a given dry rubber content of the latex. At lower selected target silica to rubber ratios (e.g., 15 phr to 45 phr), the concentration of destabilizing agent may not be high enough in the silica slurry and ultimately the silica/latex mixture to rapidly coagulate and form a solid or semi-solid silica-containing continuous rubber phase. In addition, selecting appropriate silica and rubber concentrations and appropriate relative fluid flow rates as described herein are considerations for forming the solid or semi-solid product. For example, at relatively low volumetric flow ratios of destabilized slurry to latex, the amount of the destabilizing agent in the destabilized silica slurry may not be sufficient to facilitate rapid coagulation of elastomer latex in the reaction zone. Generally, for a given elastomer latex, lower silica loadings can be achieved by increasing the destabilization of the silica slurry and/or reducing the weight percentage of silica in the destabilized slurry.

When a dispersion of silica is destabilized, the silica particles tend to flocculate. When a dispersion of silica is too highly destabilized, the silica can 'fall out' of solution and become unsuited for use in preferred embodiments.

When destabilization occurs, the surface charges on the silica are typically not completely removed. However, sometimes when the silica particle, or the silica dispersion, is treated to destabilize, the isoelectric point (IEP) may be crossed over from a negative zeta potential to a positive zeta potential value. Generally for silica, the net charge on the surface of the silica particles is reduced and the magnitude of the zeta potential is decreased during destabilization.

For higher silica to rubber ratios in the silica elastomer composite, one may select higher silica concentrations in the destabilized slurry and/or a higher silica fluid to latex fluid volumetric flow ratio. Once the silica slurry is destabilized and initially combined with the latex fluid, if the mixture does not coagulate, the volume flow ratio of the first fluid and second fluid can be adjusted, such as by decreasing the volume flow of latex, which effectively provides a higher silica to rubber ratio in the elastomer composite. In this step of adjusting the amount of latex present, the amount of latex is, or becomes, an amount that does not cause excessive dilution of the concentration of the destabilizing agent in the overall mixture such that the desired product can be formed within the residence time in the reaction zone. To obtain a desired silica to rubber ratio in the elastomer composite, various options are available. As an option, the level of destabilization of the silica slurry can be increased, such as by reducing the magnitude of the zeta potential of the destabilized silica slurry (e.g., by adding more salt and/or acid). Or, as an option, the silica concentration in the destabilized silica slurry can be adjusted, for instance, by lowering or increasing the silica concentration in the destabilized silica slurry. Or, as an option, a latex can be used that has a higher rubber content, or a latex can be diluted to a lower rubber content, or the relative flow rate of the latex can be increased. Or, as an option, the flow rate and orifice size (where each can control or affect velocity of the fluid(s)) or relative orientation of the two fluid flows can be modified to shorten or lengthen the residence time of the combined fluids in the reaction zone, and/or alter the amount and type of turbulence at the point of impact of the first fluid on the second fluid. Any one or two or more of these options can be used to adjust the process parameters and obtain a target or desired silica to rubber ratio in the elastomer composite.

The amount or level of destabilization of the silica slurry is a major factor in determining what silica to rubber ratio can be achieved in the silica elastomer composite. A destabilizing agent used to destabilize silica in the slurry may play a role in accelerating coagulation of elastomer latex particles when the destabilized silica slurry is mixed with elastomer latex in the reaction zone. It is theorized that the rate of latex coagulation in the reaction zone may depend on the concentration of the destabilizing agent in the combined fluids. It has been observed that by running the process for producing silica elastomer composite under various conditions, one may determine a threshold concentration of a destabilizing agent present in the combined mixture of fluids at the time of mixing that is effective to produce solid or semi-solid silica-containing continuous rubber phase. An example of selecting and adjusting process conditions to achieve the threshold concentration to yield solid or semi-solid silica-containing continuous rubber phase, is described in the Examples below. If the threshold concentration for a given selection and composition of fluids, volumetric flows, and velocities is not equaled or exceeded, a solid or semi-solid silica-containing continuous rubber phase will generally not be produced.

The minimum amount of destabilization of the silica slurry (or destabilization of the particle slurry) is indicated by a zeta potential magnitude of less than 30 mV (e.g. with zeta potentials such as −29.9 mV to about 29.9 mV, about −28 mV to about 20 mV, about −27 mV to about 10 mV, about −27 mV to about 0 mV, about −25 mV to about 0 mV, about −20 mV to about 0 mV, about −15 mV to about 0 mV, about −10 mV to about 0 mV and the like). If the particle slurry has been destabilized to within this zeta potential range, then the silica in the destabilized slurry can be incorporated into a solid or semi-solid silica-containing continuous rubber phase when combined with the elastomer latex.

While it may be desirable to destabilize the latex before combining it with the silica containing slurry, under shear conditions such as those present while continuously pumping the latex into the reaction zone, it is difficult to destabilize the latex fluid beforehand without causing premature coagulation of the latex. However, the destabilization agent used in the destabilized silica slurry may be present in a surplus amount to enhance destabilization of the latex, and/or mitigate dilution of the agent once the destabilized silica slurry and latex fluid are combined. As a further option, at especially high silica concentrations (e.g., >25 wt % silica in the silica slurry), some added destabilization agent can be added separately to the mixture of the destabilized silica slurry and elastomer latex in the reaction zone to enhance coagulation of the latex.

Without wishing to be bound to any theory, the process for producing silica elastomer composite is believed to form interpenetrated coherent networks of both rubber particles and silica aggregates in about two seconds or less, such as a fraction of a second, as the two fluids combine and the phase inversion occurs, resulting in a solid or semi-solid material comprising these networks with encapsulated water. Such fast network formation allows the continuous production of a solid or semi-solid silica-containing continuous rubber phase. It is theorized that shear induced agglomeration of silica particles as the destabilized silica slurry passes through an inlet nozzle to be combined with the elastomer latex may be useful for creating unique, uniform particle arrangement in rubber masterbatches and capturing silica particles within rubber through hetero-coagulation between silica and rubber particles. It is further theorized that without such an interpenetrated network, there may not be a composite of a solid or semi-sold, continuous rubber phase containing dispersed silica particles, in the shape of a worm, or solid pieces, for instance, that encapsulates 40-95 wt % water and retains all or most of the silica in subsequent dewatering processes including squeezing and high energy mechanical working.

It is theorized that the formation of a silica network arises, at least in part, from shear induced silica particle agglomeration as the destabilized silica slurry passes through a pressurized nozzle (3a) at high velocity through the first inlet (3) into the reaction zone (13), as shown in FIGS. 1A-1C. This process is facilitated by reduction of stability of silica in the destabilized slurry when the silica slurry has been destabilized (e.g., by treating the silica slurry with salt or acid or both).

It is theorized that the liquid to solid phase inversion of the latex may result from various factors, including shear induced coagulation from mixing with the high velocity jet of destabilized silica slurry, interaction of the silica surface with the latex components, ionic or chemical coagulation from contact with the silica slurry containing destabilizing agent, and a combination of these factors. In order to form composite material comprising the interpenetrated silica network and rubber network, the rates of each network formation as well as the rate of mixing should be balanced. For example, for highly destabilized silica slurries at a high salt concentration in the slurry, agglomeration and network formation of silica particles occurs rapidly under shear conditions. In this case, volumetric flows and velocities are set so the latex has a rapid rate of coagulation for formation of the interpenetrated silica/rubber networks. Rates of formation are slower with more lightly destabilized silica slurries.

One exemplary process to produce a particle reinforced elastomer composite includes feeding a continuous flow of a fluid that contains at least elastomer latex (sometimes referred to as the second fluid) through inlet 11 (FIGS. 1A, 1B, and/or 1C), to a reaction zone 13 at a volumetric flow rate of about 20 L/hr to about 1900 L/hr. The method further includes feeding a continuous flow of a further fluid containing a destabilized particle dispersion through inlet 3 (sometimes referred to as the first fluid) under pressure that can be accomplished by way of nozzle tips (in FIGS. 1A-1C, at 3a) at a volumetric flow rate of 30 L/hr to 1700 L/hr. The destabilized state of the particle dispersion and the impacting of the two fluid flows (introduced at inlets 3 and 11) under high energy conditions created by introducing the first fluid as a high velocity jet (e.g., about 6 m/s to about 250 m/s) that impacts the lower velocity latex flow (e.g., 0.4-11 m/s) entering the reaction zone at an angle approximately perpendicular to the high speed jet of the first fluid is effective to intimately mix the particles (e.g., silica and carbon black) with the latex flow, promoting a uniform distribution of particles in the flow of solid silica and carbon black-containing continuous rubber phase from the outlet of the reaction zone.

As an option, the elastomer latex introduced, for instance, through inlet 11 can be a blend of two or more latexes, such as a blend of two or more synthetic latexes. As an option, the devices in FIGS. 1A, 1B, and/or 1C can be modified to have one or more additional inlets so as to introduce other components to the reaction zone, such as one or more additional latexes. For instance, in FIG. 1C, inlet 14 can be used to introduce a further latex besides using inlet 11. The one or more additional inlets can be sequential to each other, or be adjacent to each other or set forth in any orientation as long as the material (e.g. latex) being introduced through the inlet(s) has sufficient time to disperse or be incorporated into the resulting flow. In WO 2011/034587, incorporated in its entirety by reference herein, FIGS. 1, 2A, and 2B provide examples of additional inlets and their orientations which can be adopted here for use with embodiments of the present invention. As a particular example, one inlet can introduce a flow that includes natural rubber latex and an additional inlet can introduce a synthetic elastomer latex, and these latex flows are combined with the flow of the destabilized dispersion of silica to result in the flow of a solid or semi-solid silica-containing continuous rubber phase. When more than one inlet is utilized for elastomer latex introduction, the flow rates can be the same or different from each other.

Figure 2:
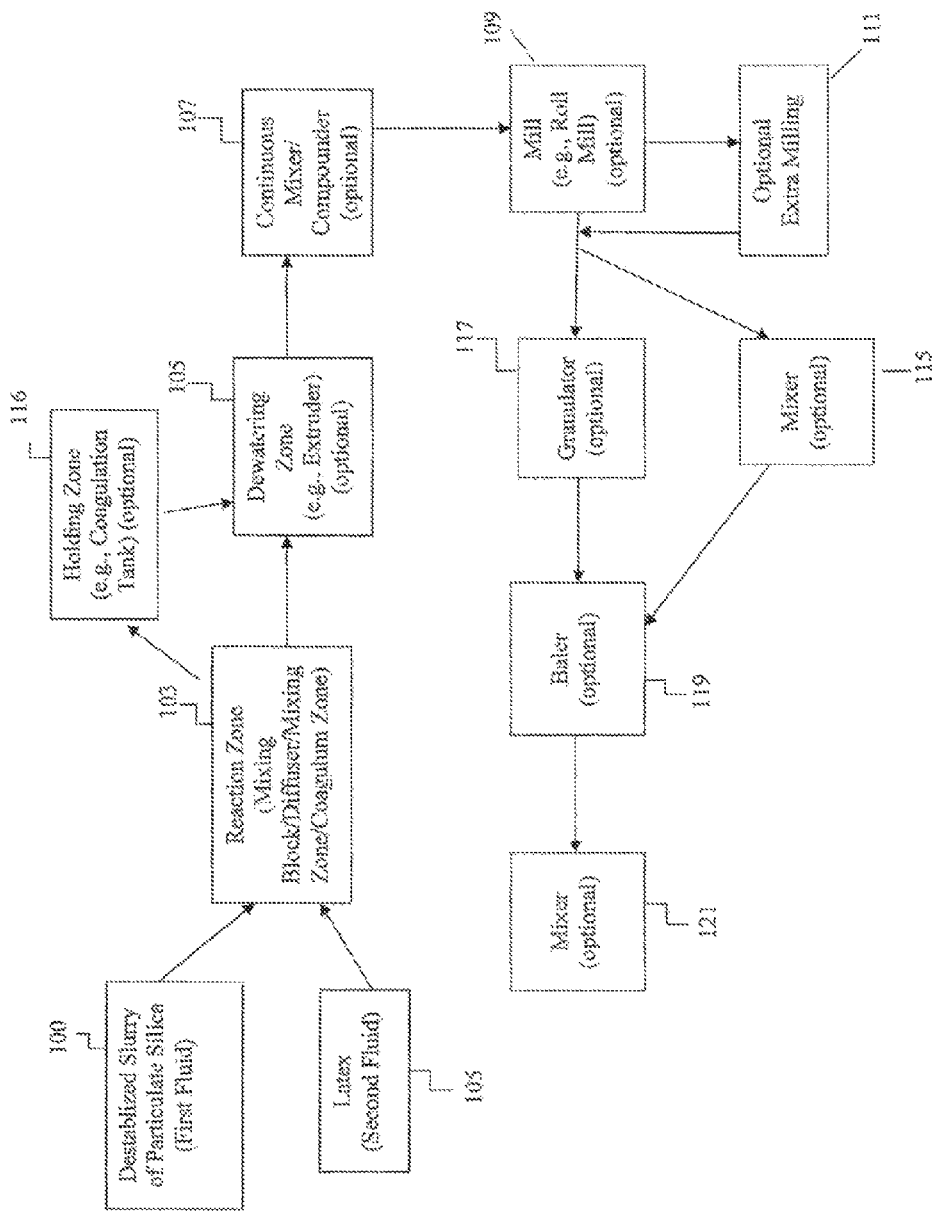
FIG. 2 is a block diagram of various steps that can occur in the formation of the elastomer composite according to embodiments of the present invention and in making rubber compounds with such elastomer composites.

FIG. 2 sets forth an example, using a block diagram of various steps that can occur in the formation of the elastomer composite. As shown in FIG. 2, the destabilized dispersion of particles that include silica (first fluid) 100 is introduced into the reaction zone 103 and the fluid containing the elastomer latex (second fluid) 105 is introduced also into the reaction zone 103. As an option, a flow of solid or semi-solid silica and carbon black-containing continuous rubber phase exits the reaction zone 103 and can optionally enter a holding zone 116 (e.g., a holding tank, with or without the addition of a salt or acid solution to further enhance coagulation of rubber and formation of silica/rubber networks); and can optionally enter, directly, or after diversion to a holding zone 116, a dewatering zone 105; can optionally enter a continuous mixer/compounder 107; can optionally enter a mill (e.g., open mill, also called a roll mill) 109; can be subjected to additional extra milling 111 (same or different conditions as mill 109) (such as same or different energy input); can be subjected to optional mixing by mixer 115, and/or can be granulated using a granulator 117, and then can optionally be baled, using a baler 119, and can optionally be broken down by use of an additional mixer 121.

With regard to the silica, one or more types of silica, or any combination of silica(s), can be used in any embodiment of the present invention. The silica suitable for reinforcing elastomer composites can be characterized by a surface area (BET) of about 20 m$^2$/g to about 450 m$^2$/g; about 30 m$^2$/g to about 450 m$^2$/g; about 30 m$^2$/g to about 400 m$^2$/g; or about 60 m$^2$/g to about 250 m$^2$/g; and for heavy vehicle tire treads a BET surface area of about 60 m$^2$/g to about 250 m$^2$/g or for example from about 80 m$^2$/g to about 200 m$^2$/g. Highly dispersible precipitated silica can be used as the filler in the present methods. Highly dispersible precipitated silica ("HDS") is understood to mean any silica having a substantial ability to dis-agglomerate and disperse in an elastomeric matrix. Such determinations may be observed in known manner by electron or optical microscopy on thin sections of elastomer composite. Examples of commercial grades of HDS include, Perkasil® GT 3000GRAN silica from WR Grace & Co, Ultrasil® 7000 silica from Evonik Industries, Zeosil® 1165 MP and 1115 MP silica from Solvay S.A., Hi-Sil® EZ 160G silica from PPG Industries, Inc., and Zeopol® 8741 or 8745 silica from JM Huber Corporation. Conventional non-HDS precipitated silica may be used as well. Examples of commercial grades of conventional precipitated silica include, Perkasil® KS 408 silica from WR Grace & Co, Zeosil® 175GR silica from Solvay S.A., Ultrasil® VN3 silica from Evonik Industries, Hi-Sil® 243 silica from PPG Industries, Inc. and the Hubersil® 161 silica from JM Huber Corporation. Hydrophobic precipitated silica with surface attached silane coupling agents may also be used. Examples of commercial grades of hydrophobic precipitated silica include Agilon®400, 454, or 458 silica from PPG Industries, Inc. and Coupsil silicas from Evonik Industries, for example Coupsil 6109 silica.

Typically the silica (e.g., silica particles) have a silica content of at least 20 wt %, at least 25 wt %, at least 30 wt %, at least 35 wt %, at least 40 wt %, at least 50 wt %, at least 60 wt %, at least 70 wt %, at least 80 wt %, at least 90 wt %, or almost 100 wt % or 100 wt %, or from about 20 wt % to about 100 wt %, all based on the total weight of the particle. Any of the silica(s) can be chemically functionalized, such as to have attached or adsorbed chemical groups, such as attached or adsorbed organic groups. Any combination of silica(s) can be used. The silica that forms the silica slurry and/or destabilized silica slurry can be in part or entirely a silica having a hydrophobic surface, which can be a silica that is hydrophobic or a silica that becomes hydrophobic by rendering the surface of the silica hydrophobic by treatment (e.g., chemical treatment). The hydrophobic surface may be obtained by chemically modifying the silica particle with hydrophobizing silanes without ionic groups, e.g., bis-triethoxysilylpropyltetrasulfide. Such a surface reaction on silica may be carried out in a separate process step before dispersion, or performed in-situ in a silica dispersion. The surface reaction reduces silanol density on the silica surface, thus reducing ionic charge density of the silica particle in the slurry. Suitable hydrophobic surface-treated silica particles for use in dispersions may be obtained from commercial sources, such as Agilon® 454 silica and Agilon® 400 silica, from PPG Industries. Silica dispersions and destabilized silica dispersions may be made using silica particles having low surface silanol density. Such silica may be obtained through dehydroxylation at temperatures over 150° C. via, for example, a calcination process.

Any reinforcing or non-reinforcing grade of carbon black may be selected to yield the desired property in the final rubber composition. Examples of reinforcing grades are N110, N121, N220, N231, N234, N299, N326, N330, N339, N347, N351, N358, and N375. Examples of semi-reinforcing grades are N539, N550, N650, N660, N683, N762, N765, N774, N787, and/or N990.

The carbon black can have any STSA such as ranging from 10 m$^2$/g to 250 m$^2$/g, 11 m$^2$/g to 250 m$^2$/g, 20 m$^2$/g to 250 m$^2$/g or higher, for instance, at least 70 m$^2$/g, such as from 70 m$^2$/g to 250 m$^2$/g, or 80 m$^2$/g to 200 m$^2$/g or from 90 m$^2$/g to 200 m$^2$/g, or from 100 m$^2$/g to 180 m$^2$/g, from 110 m$^2$/g to 150 m$^2$/g, from 120 m$^2$/g to 150 m$^2$/g and the like. As an option, the carbon black can have an Iodine Number ($I_2$ No) of from about 5 to about 35 mg $I_2$/g carbon black (per ASTM D1510). The carbon black can be a furnace black or a carbon product containing silicon-containing species, and/or metal containing species and the like. The carbon black can be for purposes of the present invention, a multi-phase aggregate comprising at least one carbon phase and at least one metal-containing species phase or silicon-containing species phase (also known as silicon-treated carbon black, such as ECOBLACK™ materials from Cabot Corporation). As stated, the carbon black can be a rubber black, and especially a reinforcing grade of carbon black or a semi-reinforcing grade of carbon black. Iodine number ($I_2$ No.) is determined according to ASTM Test Procedure D1510. STSA (statistical thickness surface area) is determined based on ASTM Test Procedure D-5816 (measured by nitrogen adsorption). OAN is determined based on ASTM D1765-10. Carbon blacks sold under the Regal®, Black Pearls®, Spheron®, Sterling®, Emperor®, Monarch®, Shoblack™, and Vulcan® trademarks available from Cabot Corporation, the Raven®, Statex®, Furnex®, and Neotex® trademarks and the CD and HV lines available from Columbian Chemicals, and the Corax®, Durax®, Ecorax®, and Purex® trademarks and the CK line available from Evonik (Degussa) Industries, and other fillers suitable for use in rubber or tire applications, may also be exploited for use with various implementations. Suitable chemically functionalized carbon blacks include those disclosed in WO 96/18688 and US2013/0165560, the disclosures of which are hereby incorporated by reference. Mixtures of any of these carbon blacks may be employed.

The carbon black can be an oxidized carbon black, such as pre-oxidized using an oxidizing agent. Oxidizing agents include, but are not limited to, air, oxygen gas, ozone, $NO_2$ (including mixtures of $NO_2$ and air), peroxides such as hydrogen peroxide, persulfates, including sodium, potassium, or ammonium persulfate, hypohalites such a sodium hypochlorite, halites, halates, or perhalates (such as sodium chlorite, sodium chlorate, or sodium perchlorate), oxidizing acids such a nitric acid, and transition metal containing oxidants, such as permanganate salts, osmium tetroxide, chromium oxides, or ceric ammonium nitrate. Mixtures of oxidants may be used, particularly mixtures of gaseous oxidants such as oxygen and ozone. In addition, carbon blacks prepared using other surface modification methods to introduce ionic or ionizable groups onto a pigment surface, such as chlorination and sulfonation, may also be used. Processes that can be employed to generate pre-oxidized carbon blacks are known in the art and several types of oxidized carbon black are commercially available.

Further, the silica slurry and/or destabilized silica slurry can contain, as an option, a minor amount (10 wt % or less, based on a total weight of particulate material) of any non-silica and non-carbon black particles, such as zinc oxide, or calcium carbonate, or other particulate materials useful in rubber compositions.

Silica may be dispersed in aqueous fluid according to any technique known to those of skill in the art. A dispersion of particulate silica can be subjected to mechanical processing, for instance, to reduce particle size. This can be done prior to or during or after destabilizing of the dispersion and can contribute in a minor way or major way to the destabilizing of the dispersion. The mechanical processing can comprise or include grinding, milling, comminution, bashing, or high shear fluid processing, or any combinations thereof.

For example, a silica slurry can be made by dispersing silica in a fluid by means of a grinding process. Such a grinding process reduces the size of most silica agglomerates (e.g. over 80% by volume) in the fluid to below 10 microns, and preferably below 1 micron, the typical size range of colloidal particles. The fluid may be water, an aqueous fluid, or a non-aqueous polar fluid. The slurry, for instance, may comprise from about 6 wt % to about 35 wt % silica-containing particles, based on the weight of the slurry. The size of silica particles may be determined using a light scattering technique. Such a slurry when made in water using silica particles having low residual salt content at a pH of 6-8, typically has a zeta potential magnitude higher than, or equal to, 30 mV and shows good stability against aggregation, gelling, and settlement in a storage tank with slow stirring (e.g. stirring speed below 60 RPM). As well-ground silica particles are generally stable in water at a pH of around 7 due to high negative charges on silica, very high shear is generally needed to overcome the repulsive energy barrier between particles to induce particle agglomeration.

In an exemplary method employing silica, such as HDS granules, the silica can be combined with water, and the resulting mixture is passed through a colloid mill, pipeline grinder, or the like to form a dispersion fluid. This fluid is then passed to a homogenizer that more finely disperses the filler in the carrier liquid to form the slurry. Exemplary homogenizers include, but are not limited to, the Microfluidizer® system commercially available from Microfluidics International Corporation (Newton, Mass., USA). Also suitable are homogenizers such as models MS18, MS45 and MC120, and series homogenizers available from the APV Homogenizer Division of APV Gaulin, Inc. (Wilmington, Mass., USA). Other suitable homogenizers are commercially available and will be apparent to those skilled in the art given the benefit of the present disclosure. The optimal operating pressure across a homogenizer may depend on the actual apparatus, the silica type, and/or the silica content. As an example, a homogenizer may be operated at a pressure of from about 10 psi to about 5000 psi or higher, for example, from about 10 psi to about 1000 psi, about 1000 psi to about 1700 psi, about 1700 psi to about 2200 psi, about 2200 psi to about 2700 psi, about 2700 psi to about 3300 psi, about 3300 psi to about 3800 psi, about 3800 psi to about 4300 psi, or about 4300 psi to about 5000 psi. As indicated earlier, the dispersion of particulate silica is destabilized before carrying out the masterbatch process, and the dispersion can be destabilized by following one of the techniques mentioned herein, before, during, or after any grinding or similar mechanical process.

Depending on the wet masterbatch method employed, a high silica concentration in slurry may be used to reduce the task of removing excess water or other carrier. For the destabilized dispersion of silica particles, the liquid used can be water or other aqueous fluid or other fluid. For the destabilized dispersion, from about 6 weight percent to about 35 weight percent filler may be employed, for example, from about 6 weight percent to about 9 weight percent, from about 9 weight percent to about 12 weight percent, from about 12 weight percent to about 16 weight percent, from about 10 weight percent to about 28 weight percent, from about 16 weight percent to about 20 weight percent, from about 20 weight percent to about 24 weight percent, from about 24 weight percent to about 28 weight percent, or from about 28 weight percent to about 30 weight percent, based on the weight of the destabilized dispersion. For the destabilized dispersion, a higher silica concentration can have benefits. For instance, silica concentration in the destabilized slurry can be at least 10 weight percent or at least 15 weight percent, based on the weight of the slurry (e.g., about 12 wt % to about 35 wt % or about 15.1 wt % to about 35 wt %, or about 20 wt % to about 35 wt %), which can provide benefits such as, but not limited to, reduced wastewater, increased production rates, and/or reduction of the equipment size needed for the process. Those skilled in the art will recognize, given the benefit of this disclosure, that the silica concentration (in weight percent) of the silica slurry (and in the destabilized silica slurry) should be coordinated with other process variables during the wet process to achieve a desired silica to rubber ratio (in phr) in the ultimate product.

Details of a dispersion that includes silica are further described below. In general, a dispersion can be a material comprising more than one phase where at least one of the phases contains or includes or consists of finely divided phase domains, optionally in the colloidal size range, dispersed throughout a continuous phase. A dispersion or slurry that includes silica or silica dispersion can be prepared as a stable suspension of particulate silica in aqueous fluid, wherein the charge at the surface of the particles prevents particle agglomeration and the dispersion is characterized by a zeta potential magnitude of greater than or equal to 30 mV. In such dispersions, the silica particles remain in stable dispersion, and/or suspension, with respect to aggregation and coalescence, for instance, for at least 8 hours. A stable dispersion can be one where constant particle size is maintained, and wherein the particles do not settle or gel, or take a very long time to settle appreciably in the presence of slow or periodic stirring, for example, not settling appreciably after 8 hours, or 12 hours or 24 hours, or 48 hours. For instance, for colloidal silica particles well dispersed in aqueous fluid, stability can generally be observed from a pH of 8 to 10. Further, with slow stirring of the dispersion, the silica particles remain suspended in the fluid by means of particle surface charge, particle surface polarity, pH, selected particle concentration, particle surface treatment, and combinations thereof. The fluid may be or include water, an aqueous mixture, or a water miscible or partially miscible fluid, such as various alcohols, ethers, and other low molecular weight water-miscible solvents, preferably having $C_1$-$C_5$ organic groups (e.g., ethanol, methanol, propanol, ethyl ether, acetone, and the like). As indicated above, the dispersion, for instance, may comprise about 6 wt % to about 35 wt %, about 10 wt % to about 28 wt %, about 12 wt % to about 25 wt %, or about 15 wt % to about 30 wt % silica-containing particles, based on the weight of the dispersion.

A stable dispersion may be a colloidal dispersion. In general, a colloidal dispersion or colloid can be a substance where dispersed particles are suspended throughout another substance. The dispersed-phase particles have a diameter of from approximately about 1 nanometer to about 1000 nanometers, and typically about 100 nanometers to about 500 nanometers. In a stable colloidal dispersion, particle size, density, and concentration are such that gravity does not cause particles to settle out of dispersion easily. Colloids with the magnitude of zeta potential of 30 mV or over are generally regarded as stable colloidal systems. Reduction of particle stability (e.g., silica) in a colloid or dispersion due to charge stabilization can be measured by reduction of magnitude of zeta potential. Particle size may be measured by a light scattering method.

A destabilized silica dispersion or destabilized particle dispersion can be understood to be a dispersion of silica in a fluid wherein weakened particle-to-particle repulsive forces allow clustering of particles and formation of a silica particle-to-particle network or gel once the destabilized dispersion is subjected to an effective amount of shear. In certain cases, mechanical shear may cause destabilization of silica dispersions and clustering of silica particles. The higher the degree of destabilization of silica slurry, the lower the shear needed for aggregation of particles, and the higher the rate of particle aggregation. For a destabilized dispersion, the dispersion can comprise from about 6 wt % to about 35 wt % particulate silica (based on the weight of the dispersion), e.g., from about 8 wt % to about 35 wt %, from about 10 wt % to about 28 wt %, from about 12 wt % to about 25 wt %, from about 15 wt % to about 30 wt %. The aqueous fluid in the destabilized dispersion of silica particles may be or include water, an aqueous mixture, or a water miscible or partially miscible fluid, such as various alcohols, ethers, and other low molecular weight water-miscible solvents, preferably having $C_1$-$C_5$ organic groups (e.g., ethanol, methanol, propanol, ethyl ether, acetone, and the like). To form silica elastomer composites, the stability of silica particles in a slurry or dispersion is reduced (i.e., destabilized) by lowering the electrostatic energy barrier between particles using an effective amount of a destabilizing agent such as acid or salt or both before the slurry is mixed with latex. A destabilizing agent may be selected for its capacity to reduce repulsive charge interaction among particle surfaces that prevent particles from agglomeration in the fluid.

A destabilized dispersion of silica or that includes silica may be obtained by lowering the pH of the dispersion of silica to close to the isoelectric point of the silica (around pH 2 for typical hydrophilic silicas). For example, destabilizing silica can be achieved by adding acid to lower a pH of the dispersion of particulate silica to 2 to 4, thus reducing the magnitude of the zeta potential of the dispersion to less than 30 mV, such as below about 28 mV (e.g., zeta potentials of magnitude of about 18 mV to about 6 mV for formic acid as the destabilization agent). The addition of acid and/or salt into silica slurry can effectively reduce the stability of silica particles dispersed in water. The acid or salt molar concentration is generally the dominant factor that determines the zeta potential of the destabilized silica slurry. In general, a sufficient amount of acid or salt or both can be used to reduce the magnitude of the zeta potential of the silica slurry to less than 30 mV, such as 28 mV or less, preferably 25 mV or less, for producing a semi-solid or solid silica-containing continuous rubber phase.

The amount of acid used to destabilize the silica dispersion can be an amount to obtain a zeta potential magnitude in the destabilized dispersion of less than 30 mV, such as 28 mV or less, or 25 mV or lower. The acid can be at least one organic or inorganic acid. The acid can be or include acetic acid, formic acid, citric acid, phosphoric acid, or sulfuric acid, or any combinations thereof. The acid can be or include a $C_1$ to $C_4$ alkyl containing acid. The acid can be or include one that has a molecular weight or a weight average molecular weight below 200, such as below 100 MW, or below 75 MW, or from about 25 MW to about 100 MW. The amount of acid can vary and depend on the silica dispersion being destabilized. The amount of acid can be, for instance, from about 0.8 wt % to about 7.5 wt %, for example, from about 1.5 wt % to about 7.5 wt % or more (based on the total weight of the fluid comprising the dispersion of silica). If an acid is the only destabilizing agent used, the amount of acid can be an amount that lowers the pH of the dispersion of silica by at least 2 pH units, or to at least a pH of 5 or lower, or the pKa range of the acid or acids in use, so as to reduce charge interactions among particles.

A destabilized dispersion may be obtained by treating a dispersion that includes silica with a destabilizing agent comprising one or more salts to alter slurry zeta potential to the range described above. The salt can be or include at least one metal salt (e.g., from Group 1, 2, or 13 metals). The salt can be or include a calcium salt, magnesium salt, or aluminum salt. Exemplary counterions include nitrate, acetate, sulfate, halogen ions such as chloride, bromide, iodine, and the like. The amount of salt can be, for instance, from about 0.2 wt % to about 2 wt % or more, for example, from about 0.5 or 1 wt % to about 1.6 wt % (based on the weight of the fluid comprising the destabilized dispersion of silica).

A combination of at least one salt and/or at least one acid can be used to destabilize the dispersion that includes the silica.

When the destabilized dispersion that includes silica is achieved with the addition of at least one salt, the salt concentration in the destabilized dispersion can be from about 10 mM to about 160 mM, or other amounts above or below this range.

When the destabilized dispersion that includes silica is achieved with the addition of at least one acid, the acid concentration in the destabilized dispersion can be from about 200 mM to about 1000 mM, for example, about 340 mM to about 1000 mM, or other amounts above or below this range.

A destabilized dispersion may be made using silica particles treated to comprise an appropriate amount of surface functional groups carrying positive charges so that the net charges on the silica surface are reduced sufficiently to decrease the magnitude of zeta potential of the dispersion below 30 mV. The net charge on the silica surface can be positive, instead of negative, as a result of such surface treatment. The positively charged functional group may be introduced to silica surface through chemical attachment or physical adsorption. For example, the silica surface may be treated with N-trimethoxylsilylpropyl-N,N,N-trimethylammonium chloride either before or after preparation of the silica dispersion. It is also possible to adsorb cationic coating agents, such as amine containing molecules and basic amino acids on the silica surface. It is theorized that a net positive charge on silica particle surfaces may enhance coagulation of the latex, which comprises negatively charged rubber particles, by means of heterocoagulation.

With regard to the "second fluid," which contains at least one elastomer latex, this fluid may contain one or more elastomer latices. An elastomer latex can be considered a stable colloidal dispersion of rubber and may contain, for example, from about 10 wt % to about 70 wt % rubber based on the total weight of the latex. The rubber can be dispersed in a fluid, such as water or other aqueous fluid, for example. The aqueous content of this fluid (or water content) can be 40 wt % or higher, such as 50 wt % or higher, or 60 wt % or higher, or 70 wt % or higher, for instance from about 40 wt % to 90 wt % based on the weight of the fluid comprising the at least one elastomer latex. Suitable elastomer latices include both natural and synthetic elastomer latices and latex blends. For example, elastomer latex may be made synthetically by polymerizing a monomer such as styrene that has been emulsified with surfactants. The latex should be appropriate for the wet masterbatch process selected and the intended purpose or application of the final rubber product. It will be within the ability of those skilled in the art to select suitable elastomer latex or a suitable blend of elastomer latices for use in the methods and apparatus disclosed here, given the benefit of this disclosure.

The elastomer latex can be or include natural rubber, such as an emulsion of natural rubber. Exemplary natural rubber latices include, but are not limited to, field latex, latex concentrate (produced, for example, by evaporation, centrifugation or creaming), skim latex (e.g., the supernatant remaining after production of latex concentrate by centrifugation) and blends of any two or more of these in any proportion. Natural rubber latex typically is treated with ammonia to preserve it, and the pH of treated latex typically ranges from 9 to 11. The ammonia content of the natural rubber latex may be adjusted, and can be reduced, e.g., by bubbling nitrogen across or through the latex. Typically, latex suppliers desludge the latex by addition of diammonium phosphate. They may also stabilize the latex by addition of ammonium laurate. The natural rubber latex may be diluted to a desired dry rubber content (DRC). Thus, the latex that can be used here can be a desludged latex. A secondary preservative, a mixture of tetramethylthiuram disulfide and zinc oxide (TZ solution) may also be included. The latex should be appropriate for the wet masterbatch process selected and the intended purpose or application of the final rubber product. The latex is provided typically in an aqueous carrier liquid (e.g., water). The amount of the aqueous carrier liquid can vary, and for instance be from about 30 wt % to about 90 wt % based on the weight of the fluid. In other words, such natural rubber latices may contain, or may be adjusted to contain, e.g., about 10 wt % to about 70 wt % rubber. Selection of a suitable latex or blend of latices will be well within the ability of those skilled in the art given the benefit of the present disclosure and the knowledge of selection criteria generally well recognized in the industry.

The natural rubber latex may also be chemically modified in some manner. For example, it may be treated to chemically or enzymatically modify or reduce various non-rubber components, or the rubber molecules themselves may be modified with various monomers or other chemical groups such as chlorine. Epoxidized natural rubber latex may be especially beneficial because the epoxidized rubber is believed to interact with the silica surface (Martin, et al., Rubber Chemistry and Technology, May 2015, doi:10.5254/rct15.85940). Exemplary methods of chemically modifying natural rubber latex are described in European Patent Publications Nos. 1489102, 1816144, and 1834980, Japanese Patent Publications Nos. 2006152211, 2006152212, 2006169483, 2006183036, 2006213878, 2006213879, 2007154089, and 2007154095, Great Britain Patent No. GB2113692, U.S. Pat. Nos. 6,841,606 and 7,312,271, and U.S. Patent Publication No. 2005-0148723. Other methods known to those of skill in the art may be employed as well.

Other exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene and the like. The elastomer may have a glass transition temperature (Tg), as measured by differential scanning calorimetry (DSC), ranging from about −120° C. to about 0° C. Examples include, but are not limited to, styrene-butadiene rubber (SBR), natural rubber and its derivatives such as chlorinated rubber, polybutadiene, polyisoprene, poly(styrene-co-butadiene) and the oil extended derivatives of any of them. Blends of any of the foregoing may also be used. The latex may be in an aqueous carrier liquid. Particular suitable synthetic rubbers include: copolymers of styrene and butadiene comprising from about 10 percent by weight to about 70 percent by weight of styrene and from about 90 to about 30 percent by weight of butadiene such as a copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, allyl-substituted acrylates, vinyl ketone, methyl isopropenyl ketone, methyl vinyl either, alpha-methylene carboxylic acids and the esters and amides thereof, such as acrylic acid and dialkylacrylic acid amide. Also suitable for use herein are copolymers of ethylene and other high alpha olefins such as propylene, 1-butene, and 1-pentene. Blends of two or more types of elastomer latex, including blends of synthetic and natural rubber latex or with two or more types of synthetic or natural rubber, may be used as well.

The rubber compositions can contain, in addition to the elastomer and filler and coupling agent, various processing aids, oil extenders, antidegradants, antioxidants, and/or other additives.

The amount of silica (in parts per hundred of rubber, or phr) present in the elastomer composite can be from about 15 phr to about 180 phr, about 20 phr to about 150 phr, about 25 phr to about 80 phr, about 35 phr to about 115 phr, about 35 phr to about 100 phr, about 40 phr to about 100 phr, about 40 phr to about 90 phr, about 40 phr to about 80 phr, about 29 phr to about 175 phr, about 40 phr to about 110 phr, about 50 phr to about 175 phr, about 60 phr to about 175 phr, and the like.

The elastomer composite may optionally include an amount of carbon black for color, conductivity, and/or UV stability and/or for other purposes.

As indicated, the carbon black contained in the elastomer composite (reinforcing grades and non-reinforcing grades) can range, for instance, from greater than 10 wt % to about 55 wt %, or greater than 10 wt % to about 50 wt %, or greater than 15 to about 40 wt %, based on the weight of the total particles present in the elastomer composite. Any grade or type of carbon black(s) can be used, such as reinforcing, or semi-reinforcing tire-grade furnace carbon blacks and the like.

In any method of producing an elastomer composite, the method can further include one or more of the following steps, after formation of the solid or semi-solid silica and carbon black-containing continuous rubber phase:
one or more holding steps or further solidification or coagulation steps to develop further elasticity;
one or more dewatering steps can be used to de-water the composite to obtain a de-watered composite;
one or more extruding steps;
one or more calendaring steps;
one or more milling steps to obtain a milled composite;
one or more granulating steps;
one or more baling steps to obtain a bailed product or mixture;
the baled mixture or product can be broken apart to form a granulated mixture;
one or more mixing or compounding steps to obtain a compounded composite.

As a further example, the following sequence of steps can occur and each step can be repeated any number of times (with the same or different settings), after formation of the solid or semi-solid silica and carbon black-containing continuous rubber phase:
one or more holding steps or further coagulation steps to develop further elasticity
dewatering the composite (e.g., the elastomer composite exiting the reaction zone) to obtain a dewatered composite;
mixing or compounding the dewatered composite to obtain a compounded mixture;
milling the compounded mixture to obtain a milled mixture (e.g., roll milling);
granulating or mixing the milled mixture;
optionally baling the mixture after the granulating or mixing to obtain a baled mixture;
optionally breaking apart the baled mixture and mixing.

In any embodiment, a coupling agent can be introduced in any of the steps (or in multiple steps or locations) as long as the coupling agent has an opportunity to become dispersed in the elastomer composite.

As just one example, the solid or semi-solid silica and carbon black-containing continuous rubber phase exiting the reaction zone or area can be transferred by a suitable apparatus (e.g., belt or conveyor), to a dewatering extruder. Suitable dewatering extruders are well known and commercially available from, for example, the French Oil Mill Machinery Co. (Piqua, Ohio, USA). Alternatively or in addition, the solid or semi-solid silica and carbon black-containing continuous rubber phase may be compressed, for example, between metallic plates, to expel at least a portion of the aqueous fluid phase, e.g., to expel aqueous fluid until the water content of such material is below 40 wt %.

In general, the post processing steps can comprise compressing the elastomer composite to remove from about 1 wt % to about 15 wt % or more, of an aqueous fluid phase, based on the total weight of the elastomer composite. The dewatering extruder may bring the elastomer composite from, e.g., approximately about 40% to about 95% water content to approximately about 5% to about 60% water content (for example, from about 5% to about 10% water content, from about 10% to about 20% water content, from about 15% to about 30% water content, or from about 30% to about 50% water content) with all weight percent based on total weight of composite. The dewatering extruder can be used to reduce the water content of the elastomer composite to about 35 wt % or other amounts. The optimal water content may vary with the elastomer employed, the amount, and/or type of filler, and the devices employed for mastication of the dewatered product. The elastomer composite may be dewatered to a desired water content, following which the resulting dewatered product can be further masticated while being dried to a desired moisture level (e.g., from about 0.5% to about 10%, for example, from about 0.5% to about 1%, from about 1% to about 3%, about 3% to about 5%, or from about 5% to about 10%, preferably below 1% all weight percent based on total weight of product). The mechanical energy imparted to the material can provide improvement in rubber properties. For example, the dewatered product may be mechanically worked with one or more of a continuous mixer, an internal mixer, a twin screw extruder, a single screw extruder, or a roll mill. This optional mixing step can have the ability to masticate the mixture and/or generate surface area or expose surface which can permit removal of water (at least a portion thereof) that may be present in the mixture. Suitable masticating devices are well known and commercially available, including for example, a Unimix Continuous Mixer and MVX (Mixing, Venting, eXtruding) Machine from Farrel Corporation of Ansonia, Conn., USA, a long continuous mixer from Pomini, Inc., a Pomini Continuous Mixer, twin rotor co-rotating intermeshing extruders, twin rotor counter-rotating non-intermeshing extruders, Banbury mixers, Brabender mixers, intermeshing-type internal mixers, kneading-type internal mixers, continuous compounding extruders, the biaxial milling extruder produced by Kobe Steel, Ltd., and a Kobe Continuous Mixer. Alternative masticating apparatus will be familiar to those of skill in the art and can be used.

As dewatered product is processed in a desired apparatus, the apparatus imparts energy to the material. Without being bound by any particular theory, it is believed that friction generated during mechanical mastication heats the dewatered product. Some of this heat is dissipated by heating and vaporizing the moisture in the dewatered product. A portion of the water may also be removed by squeezing the material in parallel with heating. The temperature should be sufficiently high to rapidly vaporize water to steam that is released to the atmosphere and/or is removed from the apparatus, but not so high as to scorch the rubber. The dewatered product can achieve a temperature from about 130° C. to about 180° C., such as from about 140° C. to about 160° C., especially when the coupling agent is added prior to or during mastication. The coupling agent can include a small amount of sulfur, and the temperature should be maintained at a sufficiently low level to prevent the rubber from cross-linking during mastication.

As an option, additives can be combined with the dewatered product in a mechanical mixer. Specifically, additives such as filler (which may be the same as, or different from, the filler used in the mixer; exemplary fillers include silica, carbon black, and/or zinc oxide), other elastomers, other or additional masterbatch (i.e., the same or different elastomer composite(s), comprising silica and/or carbon black), antioxidants, coupling agents, plasticizers, processing aids (e.g., stearic acid, which can also be used as a curing agent, liquid polymers, oils, waxes, and the like), resins, flame-retardants, extender oils, and/or lubricants, and a mixture of any of them, can be added in a mechanical mixer. Additional elastomers can be combined with the dewatered product to produce elastomer blends. Suitable elastomers include any of the elastomers employed in latex form in the mixing process described above and elastomers such as EPDM that are not available in latex form and may be the same or different than the elastomer in the silica-containing elastomer composite. Exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene, and the like. Methods of producing masterbatch blends are disclosed in commonly owned U.S. Pat. Nos. 7,105,595, 6,365,663, and 6,075,084 and PCT Publication WO2014/189826. The antioxidant (an example of a degradation inhibitor) can be an amine type antioxidant, phenol type antioxidant, imidazole type antioxidant, metal salt of carbamate, para-phenylene diamine(s) and/or dihydrotrimethylquinoline(s), polymerized quinine antioxidant, and/or wax and/or other antioxidants used in elastomer formulations. Specific examples include, but are not limited to, N-(1,3-dimethylbutyl)-N'-phenyl-p-phenylenediamine (6-PPD, e.g., ANTIGENE 6C, available from Sumitomo Chemical Co., Ltd. and NOCLAC 6C, available from Ouchi Shinko Chemical Industrial Co., Ltd.), "Ozonon" 6C from Seiko Chemical Co., Ltd., polymerized 1,2-dihydro-2,2,4-trimethyl quinoline (TMQ, e.g., Agerite Resin D, available from R. T. Vanderbilt), 2,6-di-t-butyl-4-methylphenol (available as Vanox PC from Vanderbilt Chemicals LLC), butylhydroxytoluene (BHT), and butylhydroxyanisole (BHA), and the like. Other representative antioxidants may be, for example, diphenyl-p-phenylenediamine and others such as, for example, those disclosed in The Vanderbilt Rubber Handbook (1978), pages 344-346.

The coupling agent can be or include one or more silane coupling agents, one or more zirconate coupling agents, one or more titanate coupling agents, one or more nitro coupling agents, or any combination thereof. The coupling agent can be or include bis(3-triethoxysilylpropyl)tetrasulfane (e.g., Si 69 from Evonik Industries, Struktol SCA98 from Struktol Company), bis(3-triethoxysilylpropyl)disulfane (e.g., Si 75 and Si 266 from Evonik Industries, Struktol SCA985 from Struktol Company), 3-thiocyanatopropyl-triethoxy silane (e.g., Si 264 from Evonik Industries), gamma-mercaptopropyl-trimethoxy silane (e.g., VP Si 163 from Evonik Industries, Struktol SCA989 from Struktol Company), gamma-mercaptopropyl-triethoxy silane (e.g., VP Si 263 from Evonik Industries), zirconium dineoalkanolatodi(3-mercapto) propionato-O, N,N'-bi s(2-methyl-2-nitropropyl)-1,6-diaminohexane, S-(3-(triethoxysilyl)propyl) octanethioate (e.g., NXT coupling agent from Momentive, Friendly, W. Va.), and/or coupling agents that are chemically similar or that have the one or more of the same chemical groups. Additional specific examples of coupling agents, by commercial names, include, but are not limited to, VP Si 363 from Evonik Industries. It is to be appreciated that any combination of elastomers, additives, and additional masterbatch may be added to the dewatered product, for instance in a compounder.

As an option, the dewatered product can be masticated using an internal mixer such as a Banbury or Brabender mixer. The dewatered product may first be brought to a moisture content of about 3 wt % to about 40 wt %, for example, about 5 wt % to about 20 wt %, or about 20 wt % to about 30 wt %. The moisture content may be achieved by dewatering to the desired level or by dewatering the dewatered product crumb to an intermediate moisture content as the first step and then further reducing moisture content by heating the resulting dewatered product, or by letting water evaporate from the dewatered product at room temperature, or by other methods familiar to those of skill in the art. The dewatered product may then be masticated in an internal mixer until a desired moisture level or mechanical energy input is achieved. The dewatered product can be masticated until it reaches a predetermined temperature, allowed to cool, and then placed back into the internal mixer one or more times to impart additional energy to the material. Examples of temperatures include from about 140° C. to about 180° C., for example, from about 145° C. to about 160° C., or from about 150° C. to about 155° C. The dewatered product may be sheeted in a roll mill after each mastication in the internal mixer. Alternatively or in addition, dewatered product that has been masticated in a Banbury or Brabender mixer may be further masticated in an open mill.

As an option, the masticated product can be further processed on an open mill. The masticated product can be discharged from the continuous compounder as a length of extrudate and may be cut into smaller lengths prior to entering the open mill. The masticated product may optionally be fed to the open mill via a conveyor. The conveyor may be a conveyor belt, conduit, pipe, or other suitable means for transporting the masticated product from a continuous compounder to an open mill. The open mill can include a pair of rollers that may optionally be heated or cooled to provide enhanced operation of the open mill. Other operating parameters of the open mill can include the gap distance between the rolls, the bank height, i.e., the reservoir of material in the gap between and on top of the rolls, and the speed of each roll. The speed of each roll and the temperature of the fluid used to cool each roll may be controlled independently for each roll. The gap distance may be from about 3 mm to about 10 mm or from about 6 mm to about 8 mm. The roll speed may be about 15 rpm to about 70 rpm, and the rollers may roll towards one another with respect to the inlet side of the mill. The friction ratio, the ratio of the speed of the collection roller, e.g., the roller on which the masticated product collects, to that of the back roller, may be from about 0.9 to about 1.1. The fluid employed to cool the rollers may be from about 35° C. to about 90° C., for example, from about 45° C. to about 60° C., from about 55° C. to about 75° C., or from about 70° C. to about 80° C. In addition to controlling the operation of the open mill to provide a desired level of mastication and desiccation to the masticated product, it is also desirable that the output of the open mill should collect on the collection roller as a smooth sheet. Without being bound by any particular theory, it is thought that cooler roller temperatures facilitate this goal. The open mill may reduce the temperature of the masticated product to approximately about 110° C. to about 140° C. The residence time of the masticated product in the mill can be determined in part by the roller speed, the gap distance and the amount of mastication and drying desired and may be about 10 minutes to about 20 minutes for material that has already been masticated, for example, in a twin-rotor continuous mixer.

One skilled in the art will recognize that different combinations of devices may be employed to provide mastication and desiccation to a solid silica and carbon black-containing continuous rubber phase produced according to the various embodiments. Depending on which devices are used, it may be desirable to operate them under different conditions than those described above to impart varying amounts of work and desiccation to the material. In addition, it may be desirable to employ more than one particular kind of device, e.g., an open mill or internal mixer, in series or to pass masticated product through a given device more than one time. For example, the masticated product may be passed through an open mill two or three or more times or passed through two or three or more open mills in series. In the latter case, it may be desirable to operate each open mill under different operating conditions, e.g., speed, temperature, different (e.g. higher) energy input, etc. Masticated product can be passed through one, two, or three open mills after being masticated in an internal mixer.

The elastomer composite may be used to produce an elastomer or rubber containing product. As an option, the elastomer composite may be used in or produced for use in various parts of a tire, for example, tires, tire treads, tire sidewalls, wire-skim for tires, and cushion gum for retread tires. Alternatively or in addition, elastomer composite may be used for hoses, seals, gaskets, anti-vibration articles, tracks, track pads for track-propelled equipment such as bulldozers, etc., engine mounts, earthquake stabilizers, mining equipment such as screens, mining equipment linings, conveyor belts, chute liners, slurry pump liners, mud pump components such as impellers, valve seats, valve bodies, piston hubs, piston rods, plungers, impellers for various applications such as mixing slurries and slurry pump impellers, grinding mill liners, cyclones and hydrocyclones, expansion joints, marine equipment such as linings for pumps (e.g., dredge pumps and outboard motor pumps), hoses (e.g., dredging hoses and outboard motor hoses), and other marine equipment, shaft seals for marine, oil, aerospace, and other applications, propeller shafts, linings for piping to convey, e.g., oil sands and/or tar sands, and other applications where abrasion resistance and/or enhanced dynamic properties are desired. The vulcanized elastomer composite may be used in rollers, cams, shafts, pipes, tread bushings for vehicles, or other applications where abrasion resistance and/or enhanced dynamic properties are desired.

Traditional compounding techniques may be used to combine vulcanization agents and other additives known in the art, including the additives discussed above in connection with the dewatered product, with the dried elastomer composite, depending on the desired use.

The present invention further relates to an elastomer composite formed by any one or more methods described herein of the present invention. With the present invention, a solid silica and carbon black-containing rubber phase article can be produced and comprising at least 25 phr silica (e.g., at least 29 phr, at least 35 phr, at least 40 phr silica) dispersed in rubber (such as natural rubber) and at least 40 wt % aqueous fluid and having a length dimension (L), wherein the solid silica and carbon-containing continuous rubber phase article can be stretched to at least 130 to 150% of (L) without breaking. The solid silica and carbon black-containing rubber phase article can have at least 10 phr carbon black dispersed in the rubber (e.g., natural rubber), such as at least 10 phr carbon black, at least 15 phr carbon black, or at least 20 phr carbon black.

Unless otherwise specified, all material proportions described as a percent herein are in weight percent.

The present invention will be further clarified by the following examples which are intended to be only exemplary in nature.

EXAMPLES

In these examples, the "field latex" was field latex (Muhibbah Lateks Sdn Bhd, Malaysia) having a dry rubber content of about 30 wt %. The "latex concentrate" was latex concentrate (high ammonia grade, from Muhibbah Lateks Sdn Bhd, Malaysia, or from Chemionics Corporation, Tallmadge, Ohio) diluted by about 50% to a dry rubber content of about 30 wt % using either pure water or water with 0.6 wt % to 0.7 wt % ammonia. Unless noted otherwise, the "silica" was ZEOSIL® Z1165 MP precipitated silica from Solvay USA Inc., Cranbury, N.J. (formerly Rhodia).

Thermogravimetric Analysis. The actual silica loading levels were determined by thermogravimetric analysis (TGA) following the ISO 6231 method.

Water Content of Product. The test material was cut into mm size pieces and loaded into the moisture balance (e.g., Model MB35 and Model MB45; Ohaus Corporation, Parsippany N.J.) for measurement. The water content was measured at 130° C. for 20 minutes to 30 minutes until the test sample achieved a consistent weight.

Slurry Zeta Potential. In these examples, the zeta potential of particulate slurries was measured using a ZetaProbe Analyzer™ from Colloidal Dynamics, LLC, Ponte Vedra Beach, Fla. USA. With multi-frequency electroacoustic technology, the ZetaProbe measures zeta potential directly at particle concentrations as high as 60% by volume. The instrument was first calibrated using the KSiW calibration fluid provided by Colloidal Dynamics (2.5 mS/cm). A 40 g sample was then placed into a 30 mL Teflon cup (Part #A80031) with a stir bar, and the cup was placed on a stirring base (Part #A80051) with 250 rpm stirring speed. The measurement was performed using the dip probe 173 in a single-point mode with 5-point run at ambient temperature (approximately 25° C.). The data were analyzed using ZP version 2.14c Polar™ software provided by Colloidal Dynamics. The zeta potential values can be negative or positive depending on polarity of charge on the particles. The "magnitude" of zeta potential refers to the absolute value (e.g., a zeta potential value of −35 mV has a higher magnitude than a zeta potential value of −20 mV). The magnitude of the zeta potential reflects the degree of electrostatic repulsion between similarly charged particles in dispersion. The higher the magnitude of zeta potential, the more stable of particles in dispersion. Zeta potential measurements were carried out on particulate silica slurries prepared as described below.

Dry silica was weighed and combined with deionized water using a 5-gallon bucket and a high shear overhead laboratory mixer with a shrouded agitator (Silverson Model AX3, Silverson Machines, Inc., East Longmeadow, Mass.; operating at 5200-5400 rpm for 30 minutes to 45 minutes). Once the silica was roughly dispersed in water and able to be pumped, the silica slurry was transferred via a peristaltic pump (Masterflex 7592-20 system—drive and controller, 77601-10 pump head using I/P 73 tubing; Cole-Palmer, Vernon Hills, Ill.) into a mixing loop with an inline high shear rotor-stator mixer (Silverson Model 150LB located after the peristaltic pump, operated at 60 Hz) in a run tank (30 gal. convex bottom port vessel) and was ground to further break down silica agglomerates and any remaining silica granules. The slurry in the run tank was then circulated at 2 L/min using the same peristaltic pump through the mixing loop for a time sufficient for turnover of at least 5-7 times of the total slurry volume (>45 minutes) to make sure any silica agglomerates were properly ground and distributed. An overhead mixer (Ika Eurostar power control visc-P7; IKA-Works, Inc., Wilmington, N.C.) with a low shear anchor blade rotating at about 60 rpm was used in the run tank to prevent gelling or sedimentation of silica particles. An acid (formic acid or acetic acid, reagent grade from Sigma Aldrich, St. Louis, Mo.) or salt (calcium nitrate, calcium chloride, calcium acetate or aluminum sulfate, reagent grade from Sigma Aldrich, St. Louis, Mo.) was added to the slurry in the run tank after grinding. The amount of silica in the slurry and the type and concentration of acid or salt are indicated in the specific Examples below.

Exemplary Process B. Where indicated in the examples below, an exemplary method was carried out utilizing Exemplary Process B. In Process B, dry silica was weighed and combined with deionized water using a 5-gallon bucket and a high shear overhead laboratory mixer with a shrouded agitator (Silverson Model AX3, Silverson Machines, Inc., East Longmeadow, Mass.; operating at 5200 rpm to 5400 rpm for 30-45 minutes). Once the silica was roughly dispersed in water and able to be pumped, the silica slurry was transferred via a peristaltic pump (Masterflex 7592-20 system—drive and controller, 77601-10 pump head using I/P 73 tubing; Cole-Palmer, Vernon Hills, Ill.) into a mixing loop with an inline high shear rotor-stator mixer (Silverson Model 150LB located after the peristaltic pump, operated at 60 Hz) in a run tank (30 gal convex bottom port vessel) and was ground to further break down silica agglomerates and any remaining granules. The slurry in the run tank was then circulated at 2 L/min through the mixing loop for a time sufficient for turnover of at least 5-7 times of the total slurry volume (>45 minutes) to make sure any silica agglomerates were properly ground and dispersed. An overhead mixer (Ika Eurostar power control visc-P7; IKA-Works, Inc., Wilmington, N.C.) with a low shear anchor blade rotating at about 60 rpm was used in the run tank to prevent gelling or sedimentation of silica particles. An acid (formic acid or acetic acid, reagent grade from Sigma Aldrich, St. Louis, Mo.) or salt (calcium nitrate, calcium chloride, calcium acetate, or aluminum sulfate salt, reagent grade from Sigma Aldrich, St. Louis, Mo.) was added to the slurry in the run tank after grinding.

The latex was pumped using a peristaltic pump (Masterflex 7592-20 system—drive and controller, 77601-10 pump head using I/P 73 tubing; Cole-Palmer, Vernon Hills, Ill.) through a second inlet (11) and into a reaction zone (13) configured similarly to that shown in FIG. 1B. The latex flow rate was adjusted between about 25 kg/h to about 250 kg/h in order to modify silica to rubber ratios of the elastomer composites.

When the silica was well dispersed in the water, the slurry was pumped from the run tank through a diaphragm metering pump (LEWA-Nikkiso America, Inc., Holliston, Mass.) through a pulsation dampener (to reduce pressure oscillation due to the diaphragm action) into either the reaction zone or the run tank via a recycle loop "T" connector. The direction of the slurry was controlled by two air actuated ball valves, one directing the slurry to the reaction zone and the other directing the slurry to the run tank. When ready to mix the silica slurry with latex, the line feeding the first inlet (3) to the reaction zone was pressurized to 100 psig to 150 psig by closing both valves. The ball valve directing the slurry to the reaction zone was then opened and pressurized silica slurry was fed to a nozzle (0.020' to 0.070" ID) (3a) shown in FIG. 1B, at an initial pressure of 100 psig to 150 psig, such that the slurry was introduced as a high speed jet into the reaction zone. Upon contact with the latex in the reaction zone, the jet of silica slurry flowing at a velocity of 15 m/s to 80 m/s entrained the latex flowing at 0.4 m/s to 5 m/s. In Examples according to embodiments of the invention, the impact of the silica slurry on the latex caused an intimate mixing of silica particles with the rubber particles of the latex, and the rubber was coagulated, transforming the silica slurry and the latex into an elastomer composite comprising the silica particles and 40 wt % to 95 wt % water trapped within a solid or semi-solid silica-containing, continuous rubber phase. Adjustments were made to the silica slurry flow rate (40 kg/hr to 80 kg/hr) or the latex flow rate (25 kg latex/hr to 300 kg latex/hr), or both, to modify silica to rubber ratios (e.g., 15 phr to 180 phr silica) in the resulting product and to achieve the desired continuous production rates (30 kg/hr to 200 kg/hr on dry material basis). Specific silica to rubber ratio (phr) contents following dewatering and drying are listed in the Examples below.

Process B Dewatering.

Material discharged from the reaction zone was recovered and sandwiched between two aluminum plates inside a catch pan. The "sandwich" was then inserted between two platens of a hydraulic press. With 2500 psig pressure exerted on the aluminum plates, water trapped inside the rubber product was squeezed out. If needed, the squeezed material was folded into a smaller piece and the squeezing process was repeated using the hydraulic press until the water content of the rubber product was below 40 wt %.

Process B Drying and Cooling. The dewatered product was put into a Brabender mixer (300 cc) for drying and mastication to form a masticated, dewatered elastomer composite. Sufficient dewatered material was charged into the mixer to cover the rotors. The initial temperature of the mixer was set at 100° C. and the rotor speed was generally at 60 rpm. The water remaining in the dewatered product was converted to steam and evaporated out of the mixer during the mixing process. As the material in the mixer expanded as result of evaporation, any overflowing material was removed as necessary. Either or both of a silane coupling agent (NXT silane, obtained from Momentive Performance Materials, Inc., Waterford, N.Y.; 8 wt % silane on silica weight basis) and/or antioxidant (6-PPD, N-(1,3-dimethylbutyl)-N'-phenyl-p-phenylenediamine, Flexsys, St. Louis, Mo.) was optionally added to the mixer when the mixer temperature was above 140° C. When the temperature of the mixer reached 160° C., the material inside the mixer was held at 160° C. to 170° C. by varying the rotor speed for 2 minutes before the material was dumped. The masticated, dewatered elastomer composite was then processed on an open mill. The moisture content of the material being taken off of the mill typically was below 2 wt %.

Preparation of Rubber Compounds.

Dried elastomer composite obtained by Process B was compounded according to the formulation in Table A and the procedure outlined in Table B. For silica elastomer composites where either silane or antioxidant was added during drying, the final compound composition is as specified in Table A. The amount of silane coupling agent and/or antioxidant added during compounding was adjusted accordingly.

TABLE A

| Ingredient | phr |
| --- | --- |
| NR in Composite | 100 |
| Silica in Composite | S |
| 6PPD* (antioxidant) | 2.0 |
| Silane (NXT silane**) | 0.08 × (phr silica) |
| ZnO | 4 |
| Stearic acid | 2 |
| DPG*** | 1.5 |
| Cure Rite ® BBTS**** | 1.5 |
| Sulfur | 1.5 |

*N-(1,3-dimethylbutyl)-N'-phenyl-p-phenylenediamine (Flexsys, St. Louis, MO)
**main active component: S-(3-(triethoxysilyl)propyl)octanethioate (Momentive, Friendly, WV)
***DiphenylGuanidine (Akrochem, Akron, OH)
****N-tert-Butylbenzothiazole-2-sulphenamide (Emerald Performance Materials, Cuyahoga Falls, OH)
NR = natural rubber
S = as stated

TABLE B

| | Time (min) | Operation |
| --- | --- | --- |
| Stage 1 | | Brabender mixer (300 cc), 65% fill factor, 60 rpm, 100° C. |
| | 0 | Add rubber-silica composite |
| | 1 | Add silane coupling agent, if needed Hold for 2 minutes beginning at 150° C. |
| | 2 | Sweep and add 6PPD and mix for 1 additional minute at 150° C. |
| | 3 | Sweep Dump, 160° C. Pass through roll mill 6x |
| Stage 2 | | Brabender mixer (300 cc), 63% fill factor, 60 rpm, 100° C. |
| | 0 | Add stage 1 compound |
| | 1 | Add zinc oxide and stearic acid |
| | 2 | Sweep |
| | 4 | Dump, 150° C. Pass through roll mill 6x |
| Stage 3 | | Brabender mixer (300 cc), 63% fill factor, 60 rpm, 100° C. |
| | 0 | Add stage 2 compound, sulfur and accelerators |
| | 0.5 | Sweep |
| | 1 | Dump Roll mill for one minute with adequate band. Remove and perform 6 end rolls. Sheet off to required thickness. |

Vulcanization was carried out in a heated press set at 150° C. for a time determined by a conventional rubber rheometer (i.e., T90+10% of T90, where T90 is the time to achieve 90% vulcanization).

Properties of Rubber/Silica Compounds.

The tensile properties of vulcanized samples (T300 and T100, elongation at break, tensile strength) were measured according to ASTM standard D-412. Tan delta 60° was determined using a dynamic strain sweep in torsion between 0.01% and 60% at 10 Hz and 60° C. Tan $\delta_{max}$ was taken as the maximum value of tan δ60 within this range of strains.

Example 1

A silica slurry with 27.8 wt % Zeosil® 1165 silica was prepared as described above in connection with the Slurry Zeta Potential test method. The slurry was then diluted using either deionized water or a supernatant obtained from ultracentrifugation of the 27.8 wt % slurry to make a series of silica slurries at various silica concentrations. The zeta potential of various silica slurries was measured to show the relationship between the concentration of the silica in the slurry and the zeta potential of the slurry. The zeta potential of the silica slurry, as shown in Table 1, appears to depend upon the silica concentration when the silica slurry is made using deionized water. However, as shown in Table 2, when slurry was diluted using the supernatant obtained from ultracentrifugation of the 27.8 wt % slurry, the zeta potential stays roughly the same at different silica concentrations.

TABLE 1

Zeta potential of slurry of silica made using deionized water.

| | Silica Concentration in slurry (w/w) | | | | | |
| --- | --- | --- | --- | --- | --- | --- |
| | 6% | 10% | 15% | 20% | 22% | 25% |
| Zeta Potential (mV) | −46.4 | −42.7 | −39.6 | −36.2 | −34.7 | −32.3 |
| pH | 5.19 | 5.04 | 4.92 | 4.86 | 4.83 | 4.77 |

TABLE 2

Zeta potential of silica slurry made from dilution of a 27.8 wt % silica slurry using the supernatant of the 27.8 wt % silica slurry.

| Silica Concentration in slurry (w/w) | 6% | 22% |
| --- | --- | --- |
| Zeta Potential (mV) | −31.5 | −31.4 |
| pH | 4.86 | 4.79 |

This result demonstrates that an increase of magnitude of zeta potential when such silica slurries are diluted with deionized water is mostly due to reduction of ionic strength of the slurry. The ions in the silica slurry are believed to be from residual salts present in the silica from the silica particle manufacturing process. The high magnitude of zeta potential of the silica slurries (all over 30 mV) indicated that the silica has high electrostatic stability in the slurry.

Example 2

The effect of adding salt or acid at various concentrations to silica slurries on the zeta potential of these slurries is set forth in Table 3. Slurries were prepared in deionized water by the Slurry Zeta Potential test method described above. Data summarized in Table 3 illustrate the dependence of zeta potential of silica slurries and destabilized silica slurries on the silica concentration, salt concentration, and acid concentration. Adding salt or acid to silica slurry reduces the magnitude of zeta potential, thus the stability of the silica slurry. As shown in Table 3, the zeta potential depends mostly on the concentration of salt or acid in the slurry or destabilized slurry, and not on silica concentration.

TABLE 3

Zeta potential of slurry and destabilized of silica at various slurry concentrations, salt concentrations, and acid concentrations.

| Silica Concentration in Slurry (wt %) | [CaCl$_2$] (mM) | [acetic acid] (mM) | [formic acid] (mM) | Zeta (mV) | pH |
|---|---|---|---|---|---|
| 22.0 | 0 | 0 | 0 | −34.4 | 4.80 |
| 6.0 | 0 | 0 | 0 | −45.0 | ND |
| 22.0 | 10.6 | 0 | 0 | −24.2 | 4.49 |
| 22.0 | 29.7 | 0 | 0 | −17.0 | 4.27 |
| 22.0 | 51.1 | 0 | 0 | −14.6 | 4.17 |
| 22.0 | 105 | 0 | 0 | −9.2 | ND |
| 22.0 | 155 | 0 | 0 | −6.4 | ND |
| 6.0 | 4.6 | 0 | 0 | −29.9 | ND |
| 6.0 | 10.4 | 0 | 0 | −23.4 | ND |
| 6.0 | 27.6 | 0 | 0 | −18.5 | ND |
| 6.0 | 46.4 | 0 | 0 | −15.4 | ND |
| 6.0 | 140 | 0 | 0 | −7.7 | ND |
| 22.0 | 0 | 98 | 0 | −23.6 | 3.72 |
| 22.0 | 0 | 192 | 0 | −21.4 | 3.65 |
| 22.0 | 0 | 564 | 0 | −17.1 | 3.26 |
| 22.0 | 0 | 1857 | 0 | −12.7 | ND |
| 6.0 | 0 | 27 | 0 | −33.6 | 3.84 |
| 6.0 | 0 | 45 | 0 | −29.9 | 3.68 |
| 6.0 | 0 | 174 | 0 | −22.1 | 3.38 |
| 6.0 | 0 | 431 | 0 | −18.9 | 3.61 |
| 22.0 | 0 | 0 | 118 | −15.3 | 3.17 |
| 22.0 | 0 | 0 | 197 | −14.2 | 2.96 |
| 22.0 | 0 | 0 | 731 | −10.7 | 2.46 |
| 22.0 | 0 | 0 | 1963 | −6.5 | 2.04 |
| 6.0 | 0 | 0 | 36 | −17.7 | 3.07 |
| 6.0 | 0 | 0 | 42 | −17.4 | 3.04 |
| 6.0 | 0 | 0 | 168 | −14.6 | 2.62 |
| 6.0 | 0 | 0 | 456 | −11.4 | 2.29 |
| 22.0 | 10.7 | 0 | 130 | −12.9 | 3.04 |
| 22.0 | 26.6 | 0 | 248 | −9.0 | 2.78 |
| 22.0 | 101 | 0 | 978 | −3.1 | 2.10 |
| 6.0 | 4.7 | 0 | 36 | −15.9 | 3.12 |
| 6.0 | 46.4 | 0 | 224 | −10.1 | 2.41 |

ND = not determined.

Results shown in Table 3 illustrate the dependence of zeta potential of silica slurries and destabilized silica slurries on acetic acid concentration and silica concentration. The data show that the zeta potential values are more dependent on the acid concentration than the silica concentration. A similar relationship between zeta potential to acid concentration and silica concentration is observed for formic acid. At a given concentration, formic acid reduces zeta potential magnitude more than acetic acid. As shown in Table 3, a combination of formic acid and calcium chloride was effective in reducing the zeta potential magnitude. The results in Table 3 show that the stability of silica particles in slurry can be reduced effectively through addition of destabilization agents, such as acid or salt or a combination of acid and salt. Similar results were seen for calcium nitrate and calcium acetate.

Example 3

In this example, the importance of destabilizing the dispersion of silica particles prior to contacting the silica dispersion with elastomer latex was established. Specifically, four experiments were run using the mixing apparatus of FIG. 1C, equipped with three inlets (3, 11, 14) for introducing up to three fluids into a confined reaction zone (13), such that one fluid impacted the other fluids at a 90 degree angle as a high speed jet at a velocity of 15 m/s to 80 m/s (See FIG. 1C). In three of the four experiments, the silica was ground as described above in Process B and acetic acid was optionally added as described in Examples 3-A to 3-D, below. The slurry or destabilized slurry was then pressurized to 100 psig to 150 psig and fed into the confined reaction zone through the inlet (3) at a volumetric flow rate of 60 liter per hour (L/hr) such that the slurry or destabilized slurry was introduced as a high speed jet at 80 m/s into the reaction zone. At the same time, natural rubber latex concentrate (60CX12021 latex, 31 wt % dry rubber content, from Chemionics Corporation, Tallmadge, Ohio, diluted with deionized water) was introduced into the second inlet (11) through a peristaltic pump at a volumetric flow rate of 106 L/hr and velocity of 1.8 m/s. These rates were selected and flows were adjusted to yield an elastomer composite product comprising 50 phr (parts per hundred weight dry rubber) silica. The silica slurry or destabilized silica slurry and latex were mixed by combining the low velocity latex flow and the high velocity jet of silica slurry or destabilized slurry through entraining the latex flow in the jet of silica slurry or destabilized silica slurry at the point of impact. The production rate (on a dry material basis) was set at 50 kg/hr. Specific actual silica to rubber ratios in rubber composites produced by the process are listed in the Examples below. TGA was performed following drying according to the Process B method.

Example 3-A

First Fluid: A destabilized aqueous dispersion of 25 wt % of silica with 6.2 wt % (or 1.18 M) acetic acid was prepared as described in Process B described above. The zeta potential of the destabilized slurry was −14 mV, indicating that the slurry was significantly destabilized by the acid. The destabilized silica slurry was pumped continuously under pressure into the first inlet (3).

Second Fluid: Elastomer latex was supplied to the reaction zone through the second inlet (11).

The first fluid impacted the second fluid in the reaction zone.

Results: A liquid to solid phase inversion occurred in the reaction zone when the destabilized silica slurry and latex were intimately mixed by entraining the low velocity latex flow into the high velocity jet of destabilized silica slurry. During the entrainment process, the silica was intimately distributed into the latex and the mixture coagulated into a solid phase which contained 70 wt % to 85 wt % of water. As a result, a flow of a solid silica-containing, continuous rubber phase in a worm or rope-like shape was obtained at the outlet of the reaction zone (13). The composite was elastic and could be stretched to 130% of the original length without breaking. TGA analysis on the dried product showed the elastomer composite contained 58 phr of silica.

Example 3-B

First Fluid: A destabilized aqueous dispersion of 25 wt % of silica with 6.2 wt % acetic acid was prepared according to Process B described above. The zeta potential of the slurry was −14 mV, indicating the slurry was significantly destabilized by the acid. The destabilized silica slurry was pumped continuously under pressure into the first inlet (3).

Second Fluid: Elastomer latex was supplied to the reaction zone through the second inlet (11).

Third Fluid: Deionized water was also injected into the reaction zone through third inlet (14) at a volumetric flow rate of 60 L/hr and a velocity of 1.0 m/s.

The three fluids met and impacted each other in the reaction zone.

Results: A liquid to solid phase inversion occurred in the reaction zone and a solid or semi-solid silica containing continuous rubber phase in a rope or worm-like shape was obtained from the outlet of the reaction zone. A significant amount of cloudy liquid containing silica and/or latex flowed out of the outlet (7) with the solid or semi-solid silica-containing continuous rubber phase. The silica-containing continuous rubber phase contained about 70 wt % to about 75 wt % water based on the weight of the composite. TGA analysis on the dried product showed the elastomer composite contained 44 phr of silica. Thus, the addition of water through the third inlet had a negative impact on the process, yielding a product with lower silica content (44 phr in contrast to 58 phr in Example 3-A) and significant waste product.

Example 3-C

First Fluid: A 10 wt % acetic acid aqueous solution without silica was prepared. A continuous feed of the acid fluid was pumped using a peristaltic pump at a volumetric flow rate of 60 L/hr through the third inlet (14) into the reaction zone at a velocity of 1.0 m/s at the time of entry into the reaction zone.

Second Fluid: Elastomer latex was supplied to the reaction zone through the second inlet (11) by a peristaltic pump at a velocity of 1.8 m/s and a volumetric flow rate of 106 L/hr.

The two fluids met and impacted each other in the reaction zone.

Results: A solid worm-like, sticky rubber phase was formed. TGA analysis on the dried product showed the solid rubber phase contained no silica.

Example 3-D

First Fluid: An aqueous dispersion of 25 wt % of silica without acetic acid was prepared according to Process B described above. The silica slurry was pumped under pressure continuously into the first inlet (3) at a volumetric flow rate of 60 L/hr and at a velocity of 80 m/s at the point of entry into the reaction zone. The zeta potential of the slurry was −32 mV, indicating that silica was stably dispersed in the slurry. Thus, in this Example 3-D, the silica slurry was not destabilized by addition of acid to the slurry prior to impacting the latex fluid.

Second Fluid: Elastomer latex was supplied to the reaction zone through the second inlet (11) by a peristaltic pump at a velocity of 1.8 m/s and a volumetric flow rate of 106 L/hr.

Third Fluid: After an initial period of continuous flow of the first and second fluids, a 10 wt % acetic acid aqueous solution was injected through the third inlet (14) into the reaction zone at a volumetric flow rate that increased from 0 L/hr to 60 L/hr and a velocity that increased from 0 m/s to 1.0 m/s. All three fluids impacted each other and mixed in the reaction zone.

Results: Initially, prior to the injection of acid, no silica-containing continuous rubber phase formed and only cloudy liquid came out of the reaction zone outlet (7). Upon the injection of acid into the reaction zone (13), a worm-like, semi-solid silica-containing continuous rubber phase started to form as the flow of acetic acid through the third inlet was increased from 0 L/hr to 60 L/hr. The materials flowing from the outlet still contained a significant amount of cloudy liquid, indicating a significant amount of waste. TGA analysis of the dried product showed that the silica-containing continuous rubber phase formed in this experimental run only contained 25 phr silica. Based on the production conditions selected and the amount of silica used, if the silica had been substantially incorporated into the silica-containing rubber phase as in Example 3-A, the silica would have yielded a silica-containing rubber phase comprising in excess of 50 phr silica.

These experiments show that the silica slurry must be destabilized prior to initial impact with the elastomer latex in order to achieve the desired silica-containing, continuous rubber phase. Example 3-A achieved what was considered efficient capture of the silica within the solid silica-containing, continuous rubber phase, whereas Example 3-D illustrates a comparative process utilizing an initially stable silica slurry and demonstrating less than half of the efficiency of Example 3-A utilizing an initially destabilized silica slurry. The observation of a cloudy liquid exiting the reaction zone exit point indicates insufficient mixing of the silica with the latex and a lower proportion of silica captured within the continuous rubber phase. It is theorized that in comparative processes 3B and 3D, there was insufficient destabilization of fluids during mixing. The results further show that poor capture of silica occurs when additional fluid is added while the first fluid and second fluid are being mixed together, and such process conditions generate unwanted amounts of waste.

Example 4

Exemplary Process A-1. Where indicated in the examples below, a method was carried out utilizing Exemplary Process A-1. In Process A-1, dry precipitated silica and water (municipal water filtered to remove particulate matter) were metered and combined and then ground in a rotor-stator mill to form a silica slurry, and the particulate slurry was further ground in a feed tank using an agitator and another rotor-stator mill. The silica slurry was then transferred to a run tank equipped with two stirrers. The same process used to form the silica slurry was used to prepare a carbon black slurry from dry carbon black (N-134 grade carbon black obtained from Cabot Corporation). The carbon black slurry was added on top to the silica slurry in the run tank. The silica-carbon black slurry was recirculated from the run tank through a homogenizer and back into the run tank. A solution of acid (formic acid or acetic acid, industrial grade obtained from Kong Long Huat Chemicals, Malaysia) was then pumped into the run tank. The slurry was maintained in dispersed form through stirring and, optionally, by means of the recirculating loop in the run tank. After a suitable period, the silica-carbon black slurry was fed to a confined reaction zone (13), such as the one shown in FIG. 1A, by means of the homogenizer. The concentration of silica and the carbon black in the slurry and the concentration of acid are indicated in the specific Examples below.

The latex was pumped with a peristaltic pump (at less than about 40 psig pressure) through the second inlet (11) into the reaction zone (13). The latex flow rate was adjusted between about 300-1600 kg latex/hr in order to obtain a desired production rate and silica-carbon black loading levels in the resulting product. The homogenized slurry containing acid, was pumped under pressure from the homogenizer to a nozzle (0.060"-0.130" inside diameter (ID)) (3a), represented by the first inlet (3) shown in FIG. 1A, such that the slurry was introduced as a high speed jet into the reaction zone. Upon contact with the latex in the reaction zone, the jet of silica slurry flowing at a velocity of 25 m/s to 120 m/s entrained the latex flowing at 1 m/s to 11 m/s. In Examples according to embodiments of the invention, the impact of the silica-carbon black slurry on the latex caused an intimate mixing of silica-carbon black particles with the rubber particles of the latex, and the rubber was coagulated, transforming the silica-carbon black slurry and the latex into a material comprising a solid or semi-solid silica-carbon black-containing continuous rubber phase containing 40 to 95 wt % water, based on total weight of the material, trapped within the material. Adjustments were made to the slurry flow rate (500-1800 kg/hr), or the latex flow rate (300-1800 kg/hr), or both, to modify the silica to rubber ratios (e.g., 15-180 phr silica) in the final product, and to achieve the desired production rate. The production rates (dry material basis) were 200-800 kg/hr. Specific silica contents (by TGA analysis) in the rubber following dewatering and drying of the material are listed in the Examples below.

Process A-1 Dewatering. Material was discharged from the reaction zone at atmospheric pressure at a flow rate from 200 to 800 kg/hr (dry weight) into a dewatering extruder (The French Oil Machinery Company, Piqua, Ohio). The extruder (8.5 inch I.D.) was equipped with a die plate with various die-hole buttons configurations and operated at a typical rotor speed of 90 to 123 RPM, die plate pressure 400-1300 psig, and power of 80 kW to 125 kW. In the extruder, silica-carbon black-containing rubber was compressed, and the water squeezed out of the silica-containing rubber was ejected through a slotted barrel of the extruder. Dewatered product typically containing 15-60 wt % water was obtained at the outlet of the extruder.

Process A-1 Drying and Cooling. The dewatered product was dropped into a continuous compounder (Farrel Continuous Mixer (FCM), Farrel Corporation, Ansonia, Conn.; with #7 and 15 rotors) where it was dried, masticated and mixed with 1-2 phr of antioxidant (e.g. 6PPD from Flexsys, St. Louis, Mo.) and optionally silane coupling agent (e.g. NXT silane, obtained from Momentive Performance Materials, Inc., Waterford, N.Y.; 8 wt % silane on silica weight basis). The temperature of the FCM water jacket was set at 100° C., and the FCM temperature at the output orifice was 140° C. to 180° C. The moisture content of the masticated, dewatered elastomer composite exiting the FCM was around 1 wt % to 5 wt %. The product was further masticated and cooled on an open mill. A rubber sheet of the elastomer composite was directly cut from the open mill, rolled and cooled in air.

Preparation of Rubber Compounds.

Dried elastomer composite obtained by Process A-1 was compounded according to the formulation in Table C and the procedure outlined in Table D. For elastomer composites where either silane or antioxidant was added during drying, the final compound composition is as specified in Table C. The amount of silane coupling agent and/or antioxidant added during compounding was adjusted accordingly.

TABLE C

| Ingredient | phr |
|---|---|
| NR in Composite | 100 |
| Carbon Black in Composite | S |
| Silica in Composite | S |
| 6PPD* (antioxidant) | 2.0 |
| Silane (NXT silane**) | 0.08 × (phr silica) |
| ZnO | 4 |
| Stearic acid | 2 |
| DPG*** | 1.5 |
| Cure Rite ® BBTS**** | 1.5 |
| Sulfur | 1.5 |

*N-(1,3-dimethylbutyl)-N'-phenyl-p-phenylenediamine (Flexsys, St. Louis, MO)
**main active component: S-(3-(triethoxysilyl)propyl)octanethioate (Momentive, Friendly, WV)
***DiphenylGuanidine (Akrochem, Akron, OH)
****N-tert-Butylbenzothiazole-2-sulphenamide (Emerald Performace Materials, Cuyahoga Falls, OH
NR = natural rubber
S = as stated

TABLE D

| | Time (min) | Operation |
|---|---|---|
| Stage 1 | | Brabender mixer (300 cc), 65% fill factor, 60 rpm, 100° C. |
| | 0 | Add rubber-silica-carbon black composite |
| | 1 | Add silane coupling agent, if needed Hold for 2 minutes beginning at 150° C. |
| | 2 | Sweep and add 6PPD and mix for 1 additional minute at 150° C. |
| | 3 | Sweep Dump, 160° C. Pass through roll mill 6x |
| Stage 2 | | Brabender mixer (300 cc), 63% fill factor, 60 rpm, 100° C. |
| | 0 | Add stage 1 compound |
| | 1 | Add zinc oxide and stearic acid |
| | 2 | Sweep |
| | 4 | Dump, 150° C. Pass through roll mill 6x |

TABLE D-continued

| | Time (min) | Operation |
|---|---|---|
| Stage 3 | | Brabender mixer (300 cc), 63% fill factor, 60 rpm, 100° C. |
| | 0 | Add stage 2 compound, sulfur and accelerators |
| | 0.5 | Sweep |
| | 1 | Dump Roll mill for one minute with adequate band. Remove and perform 6 end rolls. Sheet off to required thickness. |

Vulcanization was carried out in a heated press set at 150° C. for a time determined by a conventional rubber rheometer (i.e., T90+10% of T90, where T90 is the time to achieve 90% vulcanization).

Properties of Rubber/Silica-Carbon Black Compounds.

The tensile properties of vulcanized samples (T300 and T100, elongation at break, tensile strength) were measured according to ASTM standard D-412. Tan delta 60° was determined using a dynamic strain sweep in torsion between 0.01% and 60% at 10 Hz and 60° C. Tan $\delta_{max}$ was taken as the maximum value of tan δ60 within this range of strains.

In these examples, the process according to various embodiments of the invention was run in the apparatus shown in either FIG. 1A or 1B under various conditions as described in Table 4, utilizing Process A-1 described above. Operating conditions were selected to yield a solid or semi-solid silica-containing, continuous rubber phase with the silica-carbon black to rubber ratios set forth in Table 4.

ing, continuous rubber phase in a roughly cylindrical form. The product contained a major amount of water, was elastic and compressible, and expelled water and retained solids content when manually compressed. The solid material could be stretched, for example, the material could be stretched or elongated to 130-150% of its original length, without breaking. Some of the rubber properties of the composites made are shown in Table 5 below. Silica and carbon black particles were observed to be uniformly distributed throughout a continuous rubber phase and this product was substantially devoid of free silica particles and larger silica grains, both on exterior and interior surfaces. For the silica-carbon black-containing, continuous rubber phase to form, not only did the silica need to be destabilized (e.g., by prior treatment with acids and/or salts), but the volumetric flow rates of destabilized silica slurry relative to the latex had to be adjusted not only for achieving a desired silica to rubber ratio (phr) in the elastomer composite, but also for balancing the degree of slurry destabilization to the rate of slurry and latex mixing and the rate of coagulation of latex rubber particles. By means of such adjustments, as the silica slurry entrained the latex, intimately distributing silica particles (and carbon black particles) into the rubber, the rubber in the latex became a solid or semi-solid continuous phase, all within a fraction of a second after combining the fluids in the confined volume of the reaction zone. Thus, the process formed unique silica-carbon black elastomer composites by means of a continuous fluid impact step done with sufficient velocity, selected fluid solids concentrations and

TABLE 4

| Example | Silica[a] concentration in Slurry (wt %) | Carbon Black[a] concentration in Slurry (wt %) | Latex Type | Rubber Content in Latex (DRC) (wt %) | Latex wt % NH$_3$ (wt %) | Salt Type | Salt concentration in Slurry (wt %) | Zeta Potential (Est.)[b] (mV) |
|---|---|---|---|---|---|---|---|---|
| 4-1 | 15 | 1.5 | Field | 32.8 | 0.66 | N/A | 0.00 | −11.3 |
| 4-2 | 12.3 | 2.7 | Field | 32.8 | 0.66 | N/A | 0.00 | −15.0 |
| 4-3 | 12.3 | 2.7 | Field | 32.8 | 0.66 | N/A | 0.00 | −15.0 |
| 4-4 | 12.3 | 2.7 | Field | 32.8 | 0.66 | N/A | 0.00 | −15.0 |
| 4-5 | 12.3 | 2.7 | Field | 32.8 | 0.66 | N/A | 0.00 | −15.0 |
| 4-6 | 12.3 | 2.7 | Field | 32.8 | 0.66 | N/A | 0.00 | −15.0 |
| 4-7 | 12.3 | 2.7 | Field | 32.8 | 0.66 | N/A | 0.00 | −15.0 |
| 4-8 | 12.3 | 2.7 | Field | 32.8 | 0.66 | N/A | 0.00 | −15.0 |
| 4-9 | 12.3 | 2.7 | Field | 32.8 | 0.66 | N/A | 0.00 | −15.0 |

| Example | Acid Type | Acid wt % in Slurry (wt %) | Acid/ NH$_3$ molar ratio | Inlet Nozzle Velocity[c] (m/s) | Actual Silica loading (phr) | Actual Carbon Black loading (phr) | Slurry Flow Rate[d] (L/hr) | Latex Flow Rate[d] (L/hr) | Slurry-to-Latex Flow Ratio (v/v) |
|---|---|---|---|---|---|---|---|---|---|
| 4-1 | Formic | 2.00 | 1.59 | 41 | 44 | 6 | 800 | 626 | 1.278 |
| 4-2 | Acetic | 5.07 | 4.64 | 42 | 44 | 15 | 800 | 411 | 1.947 |
| 4-3 | Acetic | 5.07 | 4.64 | 42 | 44 | 15 | 800 | 411 | 1.947 |
| 4-4 | Acetic | 5.07 | 3.77 | 42 | 34.2 | 13.5 | 800 | 506 | 1.582 |
| 4-5 | Acetic | 5.07 | 3.77 | 65 | 30.4 | 10.6 | 800 | 506 | 1.582 |
| 4-6 | Acetic | 5.07 | 4.64 | 65 | 37 | 14.6 | 800 | 411 | 1.947 |
| 4-7 | Acetic | 5.07 | 4.64 | 42 | 29.5 | 9.1 | 800 | 411 | 1.947 |
| 4-8 | Acetic | 5.07 | 4.64 | 42 | 44.2 | 13.8 | 800 | 411 | 1.947 |
| 4-9 | Acetic | 5.07 | 4.64 | 42 | 43.6 | 13.6 | 800 | 411 | 1.947 |

N/A = not applicable,
ND = Not determined
[a]All examples used ZEOSIL ® Z1165 MP precipitated silica. All examples used N134 carbon black from Cabot Corporation.
[b]Zeta potential values were estimated by interpolation of experimentally determined curves of zeta potential dependence on concentration of the salt or the acid of the slurries of the same grade of silica.
[c]The inlet nozzle velocity is the velocity of the silica-carbon black slurry as it passes through a nozzle (3a) at first inlet (3) to the reaction zone (13) prior to contacting the latex.
[d]Slurry and Latex Flow Rates are the volumetric flow rates in L/hour of the silica-carbon black slurry and the latex fluid, respectively, as they are delivered to the reaction zone.

In all the examples above in Table 4, the selected operating conditions yielded a solid silica carbon black-containing, volumes, and adjusted fluid flow rates to uniformly and intimately distribute the fine particulate silica within the latex and, in parallel, as such distribution occurs, to cause a liquid to solid phase inversion of the rubber.

TABLE 5

| Example Number | T300/T100 | Tan delta @ 60° C. | Tensile Strength (MPa) | Elongation @ Break (%) * Tensile Strength (MPa) |
|---|---|---|---|---|
| 4-1 | 5.19 | 0.089 | 32.20 | 535 |
| 4-2 | 4.98 | 0.113 | 29.31 | 463 |
| 4-3 | 4.99 | 0.106 | 29.74 | 455 |
| 4-4 | 5.78 | 0.084 | 34.72 | 529 |
| 4-5 | 5.60 | 0.093 | 31.37 | 468 |
| 4-6 | 5.35 | 0.110 | 31.86 | 504 |
| 4-7 | 4.86 | 0.127 | 29.64 | 448 |
| 4-8 | 4.85 | 0.123 | 29.45 | 446 |
| 4-9 | 4.48 | 0.118 | 29.61 | 457 |

The elastomer composite formed from these Examples had acceptable rubber properties and especially showed beneficial T300/T100 properties for a composite having silica and carbon black dispersed in the composite. As shown in these examples, a solid silica and carbon black-containing rubber phase article can comprise at least 40 phr silica dispersed in natural rubber and at least 40 wt % aqueous fluid and can have a length dimension (L), wherein the solid silica and carbon black-containing continuous rubber phase article can be stretched to at least 130% to 150% of (L) without breaking.

The present invention includes the following aspects/embodiments/features in any order and/or in any combination:

1. A method of producing a silica elastomer composite, comprising:
   (a) providing a continuous flow under pressure of at least one first fluid containing dispersed particles and comprising a destabilized dispersion of silica, and a continuous flow of at least a second fluid comprising elastomer latex;
   (b) providing volumetric flow of the first fluid relative to that of the second fluid to yield a silica content of about 15 phr to about 180 phr in the silica elastomer composite;
   (c) combining the first fluid flow and the second fluid flow with a sufficiently energetic impact to distribute the silica within the elastomer latex to obtain a flow of a solid silica-containing continuous rubber phase or semi-solid silica-containing continuous rubber phase,
   wherein said at least one first fluid is provided as:
   i) two streams comprising a dispersion comprising carbon black and a destabilized dispersion comprising silica; or
   ii) a single stream comprising a dispersion comprising carbon black and a destabilized dispersion comprising silica; or
   iii) a single stream of destabilized dispersion comprising silica and carbon black.

2. The method of any preceding or following embodiment/feature/aspect, wherein said at least one first fluid is a destabilized dispersion comprising silica and carbon black, and said method further comprises combining dry carbon black, dry silica, and an aqueous medium to form said destabilized dispersion comprising at least 45 wt % silica, on a total particle basis, and carbon black.

3. The method of any preceding or following embodiment/feature/aspect, further comprising, subjecting one or more said dispersion(s) to at least one mechanical processing step.

4. The method of any preceding or following embodiment/feature/aspect, wherein said mechanical processing step comprises grinding, milling, comminution, bashing, or high shear fluid processing, or any combinations thereof.

5. The method of any preceding or following embodiment/feature/aspect, wherein said mechanical processing step comprises grinding said dispersion(s) one or more times.

6. The method of any preceding or following embodiment/feature/aspect, wherein said mechanical processing step reduces particle agglomeration, and/or adjusts particle size distribution.

7. A method of producing a silica elastomer composite, comprising:
   (a) providing a continuous flow under pressure of at least a first fluid comprising a destabilized dispersion of silica and a continuous flow of at least a second fluid comprising elastomer latex;
   (b) providing volumetric flow of the first fluid relative to that of the second fluid to yield a silica content of about 15 phr to about 180 phr in the silica elastomer composite;
   (c) providing a continuous flow of fluidized carbon black in dry form,
   (d) combining the first fluid flow and the second fluid flow, and said carbon black with a sufficiently energetic impact to distribute the silica and carbon black within the elastomer latex to obtain a flow of a solid silica-carbon black-containing continuous rubber phase or semi-solid silica-carbon black-containing continuous rubber phase,
   wherein said flow of carbon black is combined with said first fluid before step d, or combined with said second fluid before step d, or added in step d.

8. The method of any preceding or following embodiment/feature/aspect, wherein carbon black is present in said silica elastomer composite in an amount of from about 10 wt % to about 50 wt % based on total particulates present in said silica elastomer composite.

9. The method of any preceding or following embodiment/feature/aspect, wherein said flow of said solid or semi-solid silica-containing continuous rubber phase forms in two seconds or less after combining said first fluid flow and second fluid flow.

10. The method of any preceding or following embodiment/feature/aspect, wherein said flow of said solid or semi-solid silica-containing continuous rubber phase forms in about 50 milliseconds to about 1500 milliseconds after combining said first fluid flow and second fluid flow.

11. The method of any preceding or following embodiment/feature/aspect, wherein said first fluid in step (a) further comprises at least one salt.

12. The method of any preceding or following embodiment/feature/aspect, wherein said first fluid in step (a) further comprises at least one acid.

13. The method of any preceding or following embodiment/feature/aspect, wherein said solid or semi-solid silica-containing continuous rubber phase comprises from about 40 wt % to about 95 wt % water or aqueous fluid.

14. The method of any preceding or following embodiment/feature/aspect, wherein said combining occurs in a reaction zone having a volume of about 10 cc to about 500 cc.

15. The method of any preceding or following embodiment/feature/aspect, where the relative volumetric flows are at a volumetric flow ratio of first fluid to second fluid of from 0.4:1 to 3.2:1.

16. The method of any preceding or following embodiment/feature/aspect, where the relative volumetric flows are at a volumetric flow ratio of first fluid to second fluid of from 0.2:1 to 2.8:1.

17. The method of any preceding or following embodiment/feature/aspect, wherein the relative volumetric flows are at a volumetric flow ratio of first fluid to second fluid of from 0.4:1 to 3.2:1, and said destabilized dispersion of silica includes at least one salt.

18. The method of any preceding or following embodiment/feature/aspect, wherein the relative volumetric flows are at a volumetric flow ratio of first fluid to second fluid of from 0.2:1 to 2.8:1, and said destabilized dispersion of silica includes at least one acid.

19. The method of any preceding or following embodiment/feature/aspect, wherein said elastomer latex comprises a base, said destabilized dispersion of silica comprises at least one acid, and a molar ratio of hydrogen ions in said acid in said first fluid to said base in said second fluid is from 1 to 4.5.

20. The method of any preceding or following embodiment/feature/aspect, wherein said destabilized dispersion of silica comprises at least one acid, and wherein said elastomer latex present in said second fluid has an ammonia concentration of from about 0.3 wt % to about 0.7 wt % based on the weight of the elastomer latex, and a molar ratio of hydrogen ions in said acid in said first fluid to ammonia in said second fluid is at least 1:1.

21. The method of any preceding or following embodiment/feature/aspect, wherein said silica content of said silica elastomer composite is from about 26 phr to about 80 phr.

22. The method of any preceding or following embodiment/feature/aspect, wherein said silica content of said silica elastomer composite is from about 40 phr to about 115 phr.

23. The method of any preceding or following embodiment/feature/aspect, wherein said destabilized dispersion of silica comprises about 6 wt % to about 35 wt % silica.

24. The method of any preceding or following embodiment/feature/aspect, wherein said destabilized dispersion of silica comprises about 10 wt % to about 28 wt % silica.

25. The method of any preceding or following embodiment/feature/aspect, further comprising recovering said solid or semi-solid silica-containing continuous rubber phase at ambient pressure.

26. The method of any preceding or following embodiment/feature/aspect, wherein said first fluid comprising said destabilized dispersion of silica has a zeta potential magnitude of less than 30 mV.

27. The method of any preceding or following embodiment/feature/aspect, wherein said destabilized dispersion of silica includes at least one salt, wherein salt ion concentration in said destabilized dispersion is from about 10 mM to about 160 mM.

28. The method of any preceding or following embodiment/feature/aspect, wherein said destabilized dispersion of silica includes at least one salt, wherein said salt is present in said destabilized dispersion in an amount of from about 0.2 wt % to about 2 wt % based on weight of said destabilized dispersion.

29. The method of any preceding or following embodiment/feature/aspect, wherein said destabilized dispersion of silica includes at least one acid, wherein said acid is present in said destabilized dispersion in an amount of from about 0.8 wt % to about 7.5 wt % based on weight of said destabilized dispersion.

30. The method of any preceding or following embodiment/feature/aspect, wherein said destabilized dispersion of silica includes at least one acid, wherein acid concentration in said destabilized dispersion is from about 200 mM to about 1000 mM.

31. The method of any preceding or following embodiment/feature/aspect, wherein step (c) is carried out with the continuous flow of the first fluid at a velocity A and the continuous flow of the second fluid at a velocity B, and velocity A is at least 2 times faster than velocity B.

32. The method of any preceding or following embodiment/feature/aspect, wherein step (c) is carried out in a semi-confined reaction zone and the first fluid has a velocity sufficient to induce cavitation in the reaction zone upon combining with the second fluid.

33. The method of any preceding or following embodiment/feature/aspect, wherein the second fluid has a velocity sufficient to create turbulent flow.

34. The method of any preceding or following embodiment/feature/aspect, wherein said dispersion of silica comprises a surface-modified silica having hydrophobic surface moieties.

35. The method of any preceding or following embodiment/feature/aspect, wherein said first fluid comprises an aqueous fluid.

36. The method of any preceding or following embodiment/feature/aspect, wherein said first fluid comprises an aqueous fluid and about 6 wt % to about 31 wt % silica and at least 3 wt % carbon black.

37. The method of any preceding or following embodiment/feature/aspect, wherein said first fluid comprises an aqueous fluid, further comprising at least one salt, and at least one acid.

38. The method of any preceding or following embodiment/feature/aspect, said method further comprising destabilizing a dispersion of silica by lowering a pH of the dispersion of silica so as to form the destabilized dispersion of silica provided in step (a).

39. The method of any preceding or following embodiment/feature/aspect, said method further comprising destabilizing a dispersion of silica by lowering a pH of the dispersion of silica to a pH of from 2 to 4 so as to form the destabilized dispersion of silica provided in step (a).

40. The method of any preceding or following embodiment/feature/aspect, wherein said silica has a hydrophilic surface.

41. The method of any preceding or following embodiment/feature/aspect, wherein said silica is a highly dispersible silica (HDS).

42. The method of any preceding or following embodiment/feature/aspect, wherein said acid comprises acetic acid, formic acid, citric acid, phosphoric acid, or sulfuric acid, or any combinations thereof.

43. The method of any preceding or following embodiment/feature/aspect, wherein said acid has a molecular weight or an average molecular weight below 200.

44. The method of any preceding or following embodiment/feature/aspect, wherein said salt comprises at least one Group 1, 2, or 13 metal salt.

45. The method of any preceding or following embodiment/feature/aspect, wherein said salt comprises a calcium salt, magnesium salt, or aluminum salt, or a combination thereof.

46. The method of any preceding or following embodiment/feature/aspect, said method further comprising subjecting silica to mechanical processing to reduce particle agglomeration, and/or adjust particle size distribution.

47. The method of any preceding or following embodiment/feature/aspect, wherein the silica is precipitated silica or fumed silica or colloidal silica, or any combinations thereof.

48. The method of any preceding or following embodiment/feature/aspect, wherein said silica has a BET surface area of from about 20 $m^2/g$ to about 450 $m^2/g$.

49. The method of any preceding or following embodiment/feature/aspect, wherein said elastomer latex is natural rubber latex.

50. The method of any preceding or following embodiment/feature/aspect, wherein said the natural rubber latex is in the form of a field latex, latex concentrate, desludged latex, chemically modified latex, enzymatically modified latex, or any combinations thereof.

51. The method of any preceding or following embodiment/feature/aspect, wherein said the natural rubber latex is in the form of an epoxidized natural rubber latex.

52. The method of any preceding or following embodiment/feature/aspect, wherein said the natural rubber latex is in the form of a latex concentrate.

53. The method of any preceding or following embodiment/feature/aspect, further comprising mixing the silica elastomer composite with additional elastomer to form an elastomer composite blend.

54. A method for making a rubber compound comprising
   (a) conducting the method of any preceding or following embodiment/feature/aspect, and
   (b) blending the silica elastomer composite with other components to form the rubber compound, wherein said other components comprise at least one antioxidant, sulfur, polymer other than an elastomer latex, catalyst, extender oil, resin, coupling agent, additional elastomer composite(s), or reinforcing filler, or any combinations thereof.

55. A method for making a rubber article selected from tires, moldings, mounts, liners, conveyors, seals, or jackets, comprising
   (a) conducting the method of any preceding or following embodiment/feature/aspect, and
   (b) compounding the silica elastomer composite with other components to form a compound, and
   (c) vulcanizing the compound to form said rubber article.

56. The method of any preceding or following embodiment/feature/aspect, further comprising conducting one or more post processing steps after recovering the silica elastomer composite.

57. The method of any preceding or following embodiment/feature/aspect, wherein the post processing steps comprise at least one of:
   a) dewatering the silica elastomer composite to obtain a dewatered mixture;
   b) mixing or compounding the dewatered mixture to obtain a compounded silica elastomer composite;
   c) milling the compounded silica elastomer composite to obtain a milled silica elastomer composite;
   d) granulating or mixing the milled silica elastomer composite;
   e) baling the silica elastomer composite after the granulating or mixing to obtain a baled silica elastomer composite;
   f) extruding the silica elastomer composite;
   g) calendaring the silica elastomer composite; and/or
   h) optionally breaking apart the baled silica elastomer composite and mixing with further components.

58. The method of any preceding or following embodiment/feature/aspect, wherein the post processing steps comprise at least roll milling of the silica elastomer composite.

59. The method of any preceding or following embodiment/feature/aspect, wherein the post processing steps comprise compressing the solid or semi-solid silica-containing continuous rubber phase to remove from about 1 wt % to about 15 wt % of aqueous fluid contained therein.

60. The method of any preceding or following embodiment/feature/aspect, wherein the elastomer latex is brought into contact with at least one destabilizing agent as the destabilized dispersion of silica is combined with the elastomer latex.

61. The method of any preceding or following embodiment/feature/aspect, further comprising bringing the flow of solid or semi-solid silica-containing continuous rubber phase into contact with at least one destabilizing agent.

62. The method of any preceding or following embodiment/feature/aspect, further comprising the step of conducting one or more of the following with the solid or semi-solid silica-containing continuous rubber phase:
   a) transferring the solid or semi-solid silica-containing continuous rubber phase to a holding tank or container;
   b) heating the solid or semi-solid silica-containing continuous rubber phase to reduce water content;
   c) subjecting the solid or semi-solid silica-containing continuous rubber phase to an acid bath;
   d) mechanically working the solid or semi-solid silica-containing continuous rubber phase to reduce water content.

63. The method of any preceding or following embodiment/feature/aspect, wherein said silica elastomer composite is a semi-solid silica-containing continuous rubber phase, and said method further comprising converting said semi-solid silica-containing continuous rubber phase to a solid silica-containing continuous rubber phase.

64. The method of any preceding or following embodiment/feature/aspect, wherein said semi-solid silica-containing continuous rubber phase is converted to said solid silica-containing continuous rubber phase by treatment with an aqueous fluid comprising at least one acid, or at least one salt, or a combination of at least one acid and at least one salt.

65. The method of any preceding or following embodiment/feature/aspect, wherein said second fluid comprises a blend of two or more different elastomer latices.

66. The method of any preceding or following embodiment/feature/aspect, wherein said process further comprises providing one or more additional fluids and combining the one or more additional fluids with said first fluid flow and second fluid flow, wherein said one or more additional fluids comprise one or more elastomer latex fluids, and said additional fluids are the same as or different from said elastomer latex present in said second fluid flow.

67. The method of any preceding or following embodiment/feature/aspect, wherein said silica content of said silica elastomer composite is from about 26 phr to about 180 phr.

68. A solid silica and carbon black-containing continuous rubber phase article comprising at least 25 parts per hundred of rubber (phr) of silica dispersed in natural rubber and at least 40 wt % aqueous fluid, and having a length dimension (L), wherein the solid silica-containing continuous rubber phase article can be stretched to at least 130-150% of (L) without breaking.

69. The solid silica and carbon black-containing continuous rubber phase article of any preceding or following embodiment/feature/aspect, further comprising at least 10 phr of carbon black dispersed in said natural rubber.

The present invention can include any combination of these various features or embodiments above and/or below as set forth in any sentences and/or paragraphs herein. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of producing a silica elastomer composite, comprising:
   (a) providing a continuous flow under pressure of at least one first fluid comprising a destabilized dispersion of silica and a continuous flow of at least a second fluid comprising elastomer latex;
   (b) providing volumetric flow of the first fluid relative to that of the second fluid to yield a silica content of about 15 phr to about 180 phr in the silica elastomer composite;
   (c) combining the first fluid flow and second fluid flow with a sufficiently energetic impact to distribute the silica within the elastomer latex to obtain a flow of a solid-containing continuous rubber phase or semi-solid silica-containing continuous rubber phase that is the silica elastomer composite,
   wherein said at least one first fluid is provided as:
   i) two streams with one stream comprising a dispersion comprising carbon black and the other stream comprising the destabilized dispersion of silica; or
   ii) a single stream comprising a dispersion comprising carbon black and the destabilized dispersion of silica; or
   iii) a single stream of the destabilized dispersion of silica that includes carbon black.

2. The method of claim 1, wherein said at least one first fluid is said destabilized dispersion comprising silica and carbon black, and said method further comprises combining dry carbon black, dry silica, and an aqueous medium to form said destabilized dispersion comprising at least 45 wt % silica, on a total particle basis, and carbon black.

3. The method of claim 1, further comprising, subjecting said destabilized dispersion of silica to at least one mechanical processing step.

4. A method for producing a silica elastomer composite, comprising:
   (a) providing a continuous flow under pressure of at least one first fluid comprising a destabilized dispersion of silica and a continuous flow of at least a second fluid comprising elastomer latex;
   (b) providing volumetric flow of the first fluid relative to that of the second fluid to yield a silica content of about 15 phr to about 180 phr in the silica elastomer composite;
   (c) providing a continuous flow of fluidized carbon black in dry form,
   (d) combining the first fluid flow and the second fluid flow, and said carbon black with a sufficiently energetic impact to distribute the silica and carbon black within the elastomer latex to obtain a flow of a solid silica-carbon black-containing continuous rubber phase or semi-solid silica-carbon black-containing continuous rubber phase that is the silica elastomer composite, wherein said flow of carbon black is combined with said first fluid before step (d) or combined with said second fluid before step (d), or added in step (d).

5. The method of claim 1, wherein carbon black is present in said silica elastomer composite in an amount of from about 10 wt % to about 50 wt % based on total particulates present in said silica elastomer composite.

6. The method of claim 1, wherein said first fluid in step (a) further comprises at least one salt.

7. The method of claim 1, wherein said first fluid in step (a) further comprises at least one acid.

8. The method of claim 1, wherein said solid or semi-solid silica-containing continuous rubber phase comprises from about 40 wt % to about 95 wt % water or aqueous fluid.

9. The method of claim 1, where the relative volumetric flows are at a volumetric flow ratio of first fluid to second fluid of from 0.4:1 to 3.2:1.

10. The method of claim 1, wherein said elastomer latex comprises a base, said destabilized dispersion of silica comprises at least one acid, and a molar ratio of hydrogen ions in said acid in said first fluid to said base in said second fluid is from 1 to 4.5.

11. The method of claim 1, wherein said destabilized dispersion of silica comprises about 6 wt % to about 35 wt % silica.

12. The method of claim 1, wherein said first fluid comprising said destabilized dispersion of silica has a zeta potential magnitude of less than 30 mV.

13. The method of claim 1, wherein said destabilized dispersion of silica includes at least one salt, wherein salt ion concentration in said destabilized dispersion is from about 10 mM to about 160 mM.

14. The method of claim 1, wherein said destabilized dispersion of silica includes at least one acid, wherein acid concentration in said destabilized dispersion is from about 200 mM to about 1000 mM.

15. The method of claim 1, wherein step (c) is carried out with the continuous flow of the first fluid at a velocity A and the continuous flow of the second fluid at a velocity B, and velocity A is at least 2 times faster than velocity B.

16. The method of claim 1, wherein said first fluid comprises an aqueous fluid and about 6 wt % to about 31 wt % silica and at least 3 wt % carbon black.

17. The method of claim 1, said method further comprising destabilizing a dispersion of silica by lowering a pH of the dispersion of silica so as to form the destabilized dispersion of silica provided in step (a).

18. The method of claim 7, wherein said acid comprises acetic acid, formic acid, citric acid, phosphoric acid, or sulfuric acid, or any combinations thereof.

19. The method of claim 6, wherein said salt comprises at least one Group 1, 2, or 13 metal salt.

20. The method of claim 6, wherein said salt comprises a calcium salt, magnesium salt, or aluminum salt, or a combination thereof.

21. The method of claim 1, wherein said elastomer latex is natural rubber latex in the form of a field latex, latex concentrate, desludged latex, chemically modified latex, enzymatically modified latex, epoxidized natural rubber latex, or any combinations thereof.

22. The method of claim 1, further comprising mixing the silica elastomer composite with additional elastomer to form an elastomer composite blend.

23. A method for making a rubber compound comprising: blending the silica elastomer composite prepared by the method of claim 1.

24. A method for making a rubber article selected from the tires, moldings, mounts, liners, conveyors, seals, or jackets, comprising: compounding: (a) compounding the silica elastomer composite prepared by the method of claim 1.

25. The method of claim 1, further comprising conducting one or more post processing steps after recovering the silica elastomer composite, wherein the post processing steps comprise at least one of:
    a) dewatering the silica elastomer composite to obtain a dewatered mixture;
    b) mixing or compounding the dewatered mixture to obtain a compounded silica elastomer composite;
    c) milling the compounded silica elastomer composite to obtain a milled silica elastomer composite;
    d) granulating or mixing the milled silica elastomer composite;
    e) baling the silica elastomer composite after the granulating or mixing to obtain a baled silica elastomer composite;
    f) extruding the silica elastomer composite;
    g) calendaring the silica elastomer composite; and/or
    h) optionally breaking apart the baled silica elastomer composite and mixing with further components.

26. The method of claim 1, wherein the elastomer latex is brought into contact with at least one destabilizing agent as the destabilized dispersion of silica is combined with the elastomer latex.

27. The method of claim 1, further comprising the step of conducting one or more of the following with the solid or semi-solid silica-containing continuous rubber phase:
    a) transferring the solid or semi-solid silica-containing continuous rubber phase to a holding tank or container;
    b) heating the solid or semi-solid silica-containing continuous rubber phase to reduce water content;
    c) subjecting the solid or semi-solid silica-containing continuous rubber phase to an acid bath;
    d) mechanically working the solid or semi-solid silica-containing continuous rubber phase to reduce water content.

28. The method of claim 1, wherein said silica elastomer composite is a semi-solid silica-containing continuous rubber phase, and said method further comprising converting said semi-solid silica-containing continuous rubber phase to a solid silica-containing continuous rubber phase, wherein said semi-solid silica-containing continuous rubber phase is converted to said solid silica-containing continuous rubber phase by treatment with an aqueous fluid comprising at least one acid, or at least one salt, or a combination of at least one acid and at least one salt.

29. The method of claim 1, wherein said silica content of said silica elastomer composite is from about 26 phr to about 180 phr.

* * * * *